United States Patent
Yang et al.

(10) Patent No.: US 9,432,994 B2
(45) Date of Patent: Aug. 30, 2016

(54) METHOD FOR TRANSRECEIVING SIGNALS AND APPARATUS FOR SAME

(71) Applicant: LG ELECTRONICS INC., Seoul (KR)

(72) Inventors: Suckchel Yang, Anyang-si (KR); Bonghoe Kim, Anyang-si (KR); Joonkui Ahn, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/376,114

(22) PCT Filed: Mar. 11, 2013

(86) PCT No.: PCT/KR2013/001929
§ 371 (c)(1),
(2) Date: Jul. 31, 2014

(87) PCT Pub. No.: WO2013/133678
PCT Pub. Date: Sep. 12, 2013

(65) Prior Publication Data
US 2015/0016408 A1    Jan. 15, 2015

Related U.S. Application Data

(60) Provisional application No. 61/608,644, filed on Mar. 9, 2012.

(51) Int. Cl.
*H04W 4/00* (2009.01)
*H04W 72/04* (2009.01)
(Continued)

(52) U.S. Cl.
CPC .......... *H04W 72/0446* (2013.01); *H04L 5/001* (2013.01); *H04L 5/005* (2013.01);
(Continued)

(58) Field of Classification Search
None
See application file for complete search history.

(56) References Cited

U.S. PATENT DOCUMENTS

2011/0044250 A1\* 2/2011 Han et al. .............. 370/328
2012/0009923 A1 1/2012 Chen et al.
(Continued)

FOREIGN PATENT DOCUMENTS

KR 10-2010-0095129 8/2010
KR 10-2010-0118070 11/2010
(Continued)

OTHER PUBLICATIONS

PCT International Application No. PCT/KR2013/001929, Written Opinion of the International Searching Authority dated Jun. 26, 2013, 14 pages.
(Continued)

*Primary Examiner* — Edan Orgad
*Assistant Examiner* — Rebecca Song
(74) *Attorney, Agent, or Firm* — Lee Hong Degerman Kang & Waimey; Jonathan Kang; Jeffrey Lotspeich

(57) ABSTRACT

The present invention relates to a wireless communication system. More specifically, the present invention relates to a method for receiving data on user equipment supporting a plurality of types of carriers in the wireless communication system, and to the apparatus for same, the method comprising the steps of: receiving a transmission mode-common (TM-common) downlink control information (DCI) format including downlink scheduling information; and receiving the data through a resource indicated by the downlink scheduling information, wherein the data is modulated by using a user equipment-specific (UE-specific) reference signal when the data is received through a first type of carrier, and the data is modulated through a first cell-common reference signal when the data is received through second type of carrier.

10 Claims, 18 Drawing Sheets

(51) Int. Cl.
*H04L 5/00* (2006.01)
*H04L 27/26* (2006.01)

(52) U.S. Cl.
CPC .......... *H04L 5/0051* (2013.01); *H04L 5/0053* (2013.01); *H04L 27/2613* (2013.01); *H04L 27/2655* (2013.01); *H04L 27/2692* (2013.01); *H04L 5/0016* (2013.01); *H04L 5/0023* (2013.01); *H04L 5/0037* (2013.01)

(56) References Cited

U.S. PATENT DOCUMENTS

| | | | |
|---|---|---|---|
| 2013/0044692 A1* | 2/2013 | Nory et al. | 370/329 |
| 2013/0083681 A1* | 4/2013 | Ebrahimi Tazeh Mahalleh | H04L 5/0057 370/252 |
| 2013/0114528 A1* | 5/2013 | Chen et al. | 370/329 |
| 2013/0176952 A1* | 7/2013 | Shin et al. | 370/329 |

FOREIGN PATENT DOCUMENTS

| | | |
|---|---|---|
| KR | 10-2010-0137357 | 12/2010 |
| KR | 10-2011-0081070 | 7/2011 |
| KR | 10-2011-0122033 | 11/2011 |
| WO | 2011/017515 | 2/2011 |

OTHER PUBLICATIONS

PCT International Application No. PCT/KR2013/001929, Written Opinion of the International Searching Authority dated Jun. 26, 2013, 1 page.

Korean Intellectual Property Office Application Serial No. 10-2014-7021437, Notice of Allowance dated Jan. 6, 2016, 2 pages.

* cited by examiner

FIG. 11
(a)
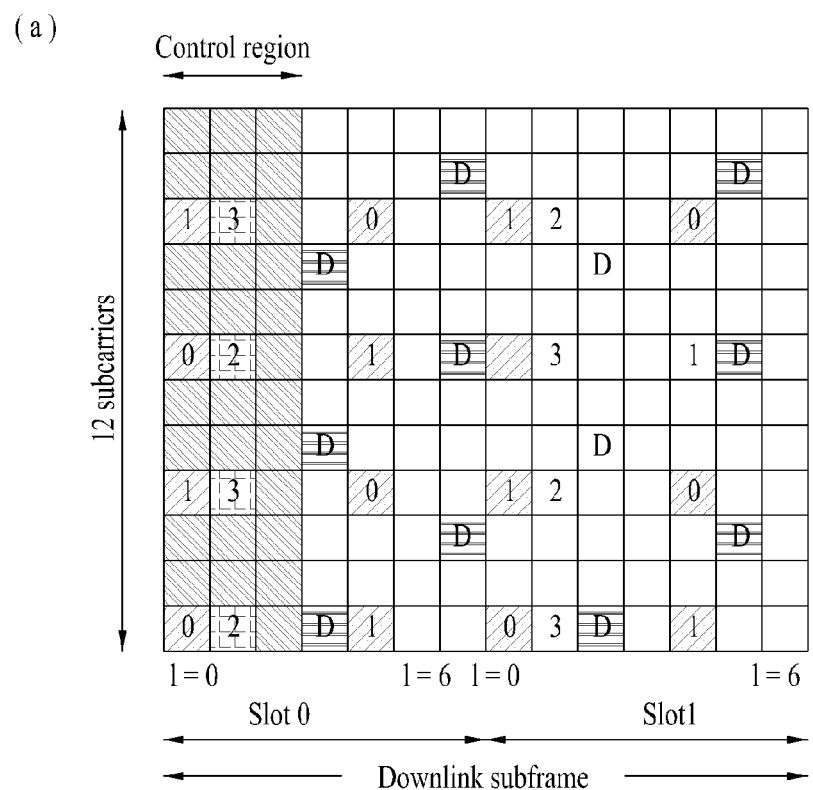
(b)
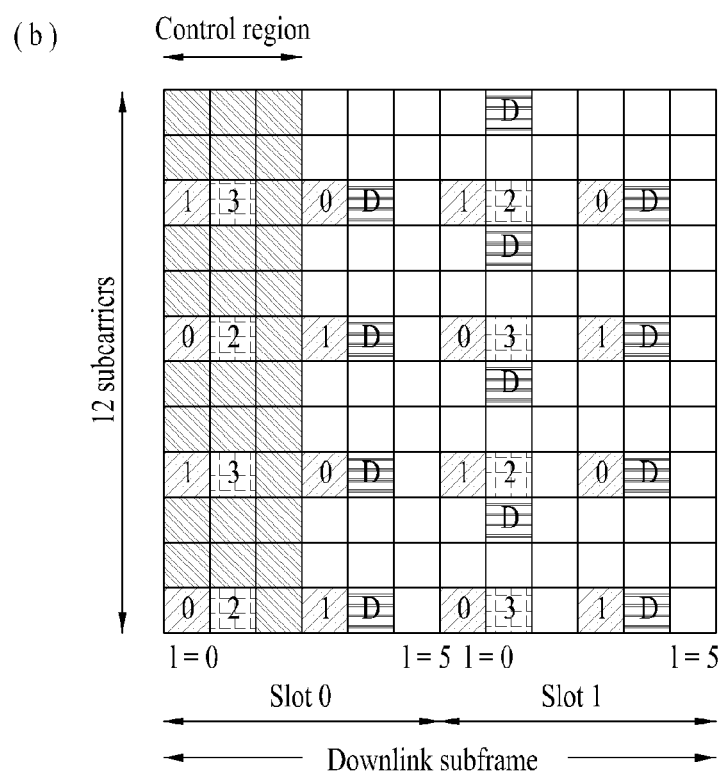

METHOD FOR TRANSRECEIVING SIGNALS AND APPARATUS FOR SAME

CROSS-REFERENCE TO RELATED APPLICATIONS

This application is the National Stage filing under 35 U.S.C. 371 of International Application No. PCT/KR2013/001929, filed on Mar. 11, 2013, which claims the benefit of U.S. Provisional Application Ser. No. 61/608,644, filed on Mar. 9, 2012, the contents of which are all hereby incorporated by reference herein in their entirety.

TECHNICAL FIELD

The present invention relates to a wireless communication system, and more particularly, to a method for transceiving data considering carrier types, and an apparatus for the same.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An object of the present invention devised to solve the conventional problem is to provide a method for efficiently transmitting and receiving a signal in a wireless communication system and an apparatus for the same.

Also, another object of the present invention is to provide a method for efficiently transmitting and receiving a signal in a wireless communication system which uses a carrier type not compatible with that of the existing LTE system, and an apparatus for the same.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In one aspect of the present invention, a method for receiving data in a user equipment supporting a plurality of carrier types in a wireless communication system, comprises receiving a transmission mode-common (TM-common) downlink control information (DCI) format including downlink scheduling information; and receiving the data through a resource indicated by the downlink scheduling information, wherein the data is demodulated using a user equipment-specific (UE-specific) reference signal when the data is received via a first type carrier, and the data is demodulated using a first cell-common reference signal when the data is received via a second type carrier.

Preferably, the first type carrier may be a carrier via which a second cell-common reference signal is received at a certain subframe only, and the second type carrier may be a carrier via which the first cell-common reference signal is received at all subframes.

More preferably, the second cell-common reference signal may be a reference signal for time and frequency synchronization.

More preferably, a part or all of a resource allocation region indicated by the downlink resource allocation information may include a region where the second cell-common reference signal is configured.

Preferably, the UE-specific reference signal may be received through an antenna port 7 or 8, and the first cell-common reference signal is received through an antenna port 0.

Preferably, when the transmission mode-common DCI format and the data are received on the same first type carrier, the data may be received using the UE-specific reference signal used for reception of the transmission mode-common DCI format.

In another aspect of the present invention, a user equipment for receiving data from a base station in a wireless communication system comprises a radio frequency (RF) module; and a processor, wherein the processor is configured to receive a transmission mode-common (TM-common) downlink control information (DCI) format including downlink scheduling information and receive the data through a resource indicated by the downlink scheduling information, wherein the data is demodulated using a user equipment-specific (UE-specific) reference signal when the data is received via a first type carrier, and the data is demodulated using a first cell-common reference signal when the data is received via a second type carrier.

Preferably, the first type carrier may be a carrier via which a second cell-common reference signal is received at a certain subframe only, and the second type carrier may be a carrier via which the first cell-common reference signal is received at all subframes.

More preferably, the second cell-common reference signal may be a reference signal for time and frequency synchronization.

More preferably, a part or all of a resource allocation region indicated by the downlink resource allocation information may include a region where the second cell-common reference signal is configured.

Preferably, the UE-specific reference signal may be received through an antenna port 7 or 8, and the first cell-common reference signal may be received through an antenna port 0.

Preferably, when the transmission mode-common DCI format and the data are received on the same first type carrier, the data is received using the UE-specific reference signal used for reception of the transmission mode-common DCI format.

According to the present invention, a signal may efficiently be transmitted and received in a wireless communication system. Also, according to the present invention, the signal may efficiently be transmitted and received in the wireless communication system which uses a carrier type not compatible with that of the existing LTE system.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 11 is a diagram illustrating a reference signal pattern mapped into downlink resource block (RB) pair in an LTE system;

BEST MODE FOR CARRYING OUT THE INVENTION

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A $3^{rd}$ generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE. For clarification of the description, although the present invention will be described based on the 3GPP LTE/LTE-A, it is to be understood that technical spirits of the present invention are not limited to the 3GPP LTE/LTE-A.

In a wireless access system, a user equipment receives information from a base station through a downlink (DL), and also transmits information to the base station through an uplink (UL). Examples of information transmitted and received between the user equipment and the base station include data and various kinds of control information. Various physical channels exist depending on types and usage of information transmitted or received between the user equipment and the base station.

Figure 1:
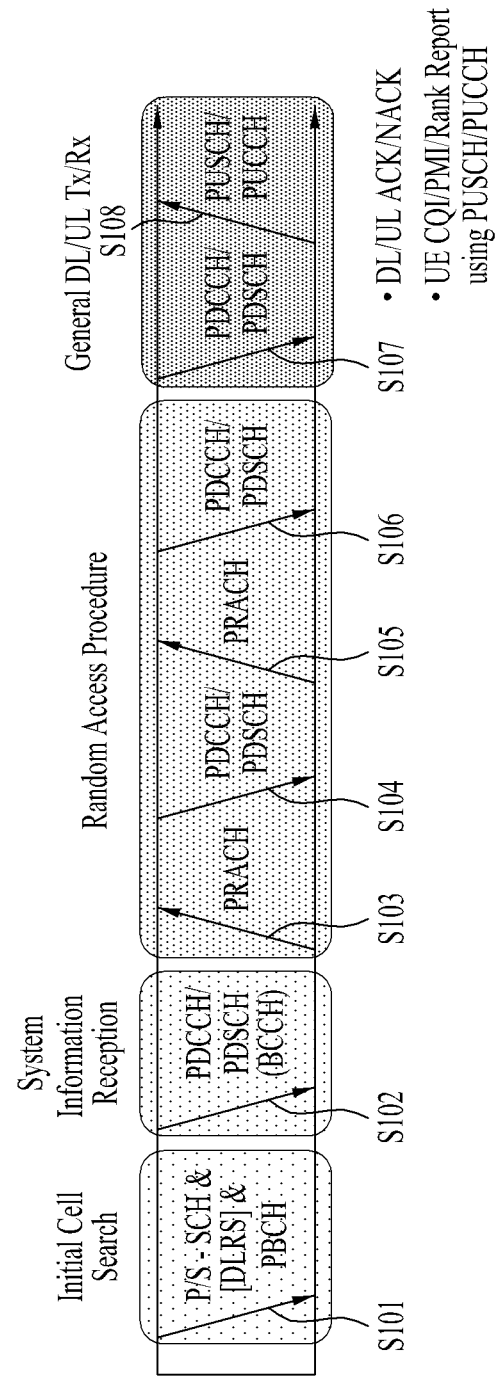
FIG. 1 is a diagram illustrating physical channels used in a 3GPP LTE system and a general method for transmitting a signal using the physical channels.

FIG. 1 is a diagram illustrating physical channels used in a 3GPP LTE system and a general method for transmitting a signal using the physical channels.

The user equipment, of which power is turned on, or which newly enters a cell, performs initial cell search such as synchronizing with the base station at step S101. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink control channel (PDCCH) and a physical downlink shared channel (PDSCH) based on the PDCCH at step S102.

Afterwards, the user equipment may perform a random access procedure (RACH) such as steps S103 to S106 to complete access to the base station. To this end, the user equipment may transmit a preamble through a physical random access channel (PRACH) (S103), and may receive a response message to the preamble through the PDCCH and the PDSCH corresponding to the PDCCH (S104). In case of a contention based RACH, the user equipment may perform a contention resolution procedure such as transmission (S105) of additional physical random access channel and reception (S106) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S107) and transmit a physical uplink shared channel (PUSCH) and a physical uplink control channel (PUCCH) (S108), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. The CSI includes a channel quality indicator (CQI), a precoding matrix indicator (PMI), rank indication (RI), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 2:
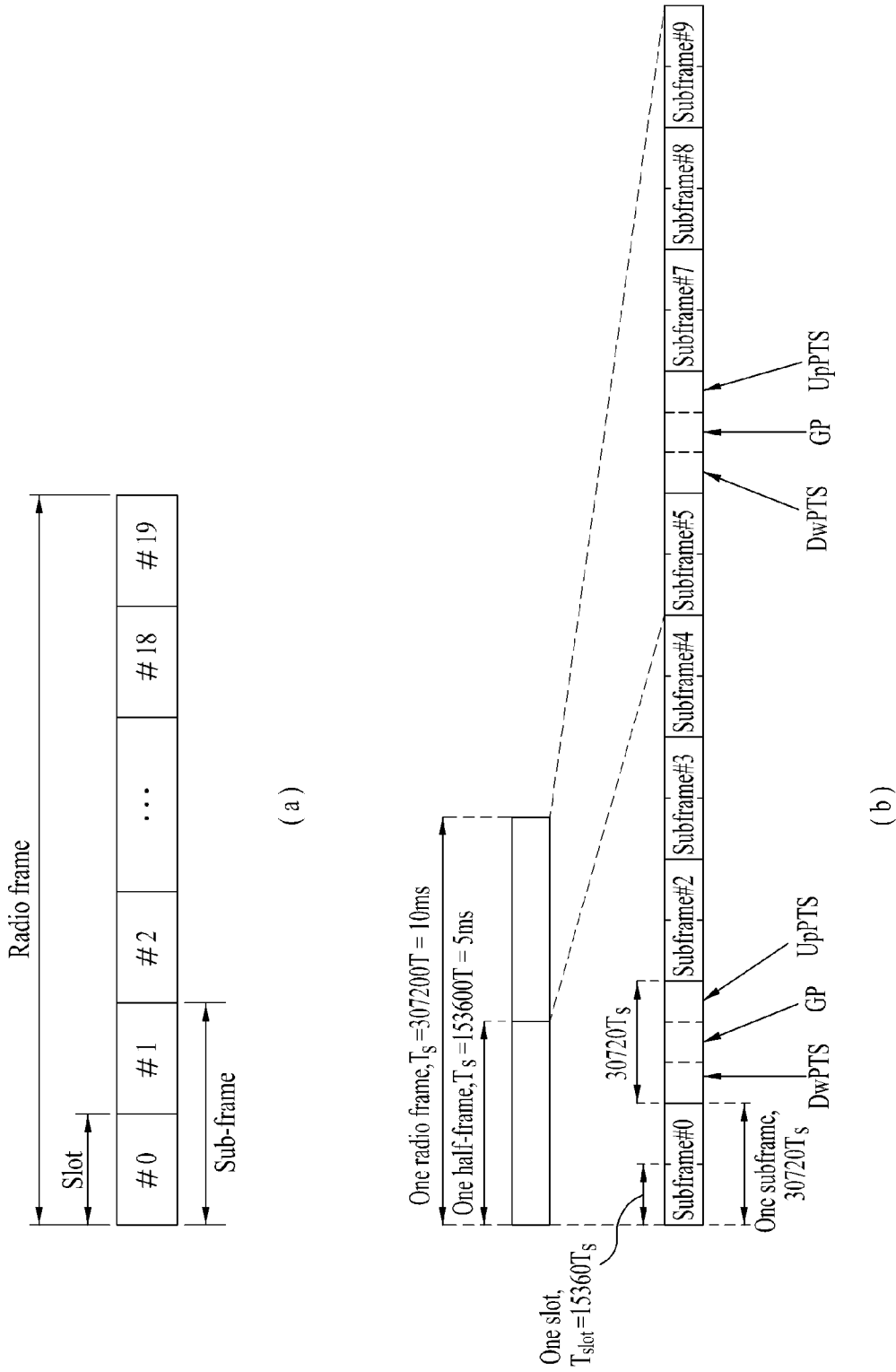
FIG. 2 is a diagram illustrating a structure of a radio frame used in an LTE system.

FIG. 2 is a diagram illustrating a structure of a radio frame. In a cellular OFDM communication system, uplink/downlink data packet transmission is performed in a subframe unit, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 2(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of the subframe may be allocated to a physical downlink control channel (PDCCH), and the other OFDM symbols may be allocated to a physical downlink shared channel (PDSCH).

FIG. 2(b) is a diagram illustrating a structure of a type 2 radio frame. The type 2 radio frame includes two half frames, each of which includes five subframes, a downlink pilot time slot (DwPTS), a guard period (GP), and an uplink pilot time slot (UpPTS). One subframe includes two slots. The DwPTS is used for initial cell search, synchronization or channel estimation at the user equipment. The UpPTS is used to synchronize channel estimation at the base station with uplink transmission of the user equipment. Also, the guard period is to remove interference occurring in the uplink due to multipath delay of downlink signals between the uplink and the downlink. Table 1 illustrates uplink-downlink configuration of subframes within the radio frame in the TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, D represents a downlink subframe (DL SF), U represents an uplink subframe (UL SF), and S represents a special subframe. The special subframe includes DwPTS, GP, and UpPTS. Table 2 illustrates a configuration of the special subframe.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The aforementioned structure of the radio frame is only exemplary, and various modifications may be made in the number of subframes included in the radio frame, the number of slots included in the subframe, or the number of symbols included in the slot.

Figure 3:
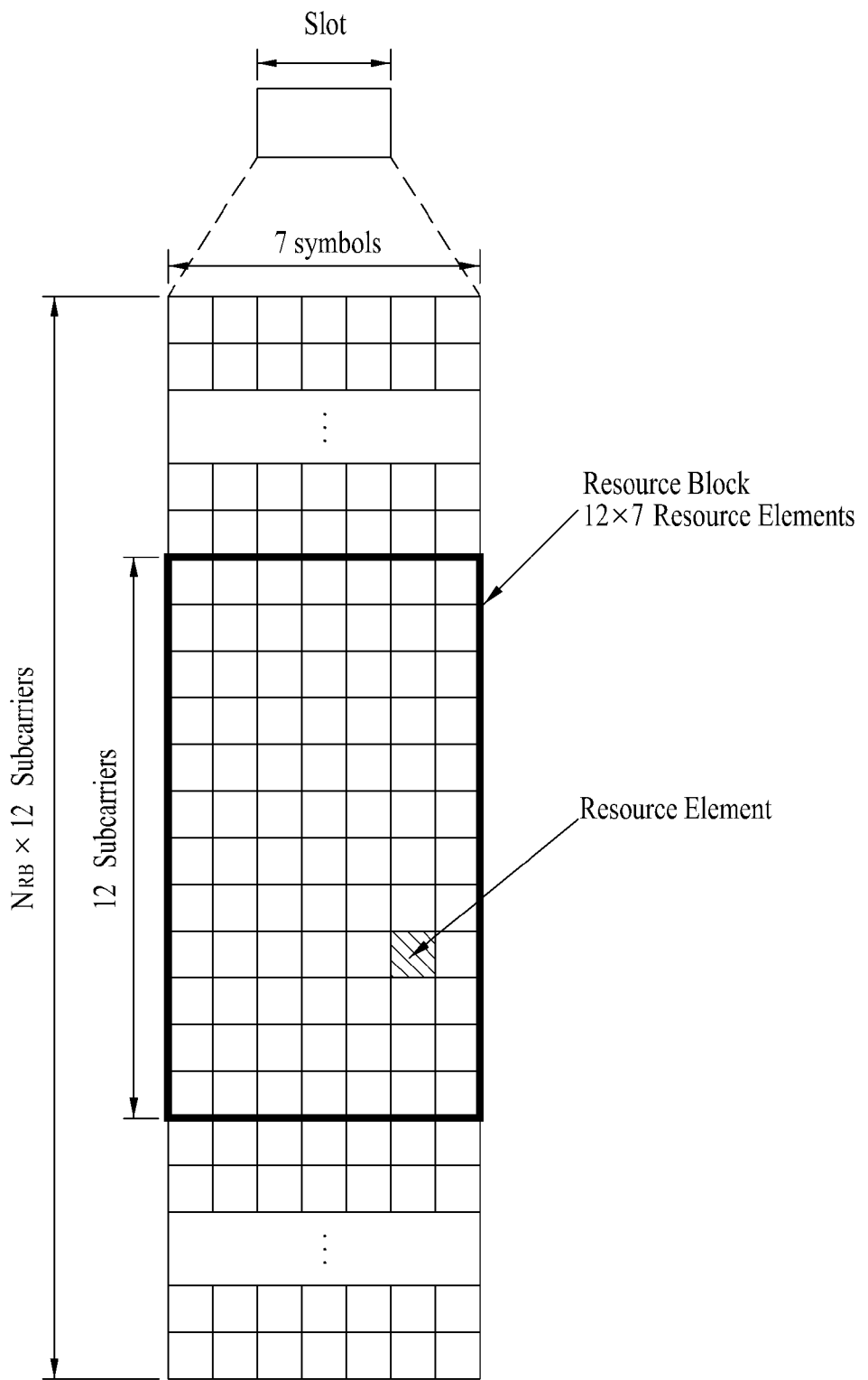
FIG. 3 is a diagram illustrating a resource grid of a downlink slot used in an LTE system.

FIG. 3 is a diagram illustrating a resource grid for a downlink slot used in an LTE system.

Referring to FIG. 3, the downlink slot includes a plurality of OFDM symbols in a time domain. In this case, one downlink slot includes, but not limited to, seven OFDM symbols, and one resource block (RB) includes, but not limited to, twelve subcarriers in a frequency domain. Each element on the resource grid will be referred to as a resource element (RE). One resource block (RB) includes 12×7(6) resource elements. The number $N_{DL}$ of resource blocks (RBs) included in the downlink slot depends on a downlink transmission bandwidth. A structure of an uplink slot may be the same as that of the downlink slot.

Figure 4:
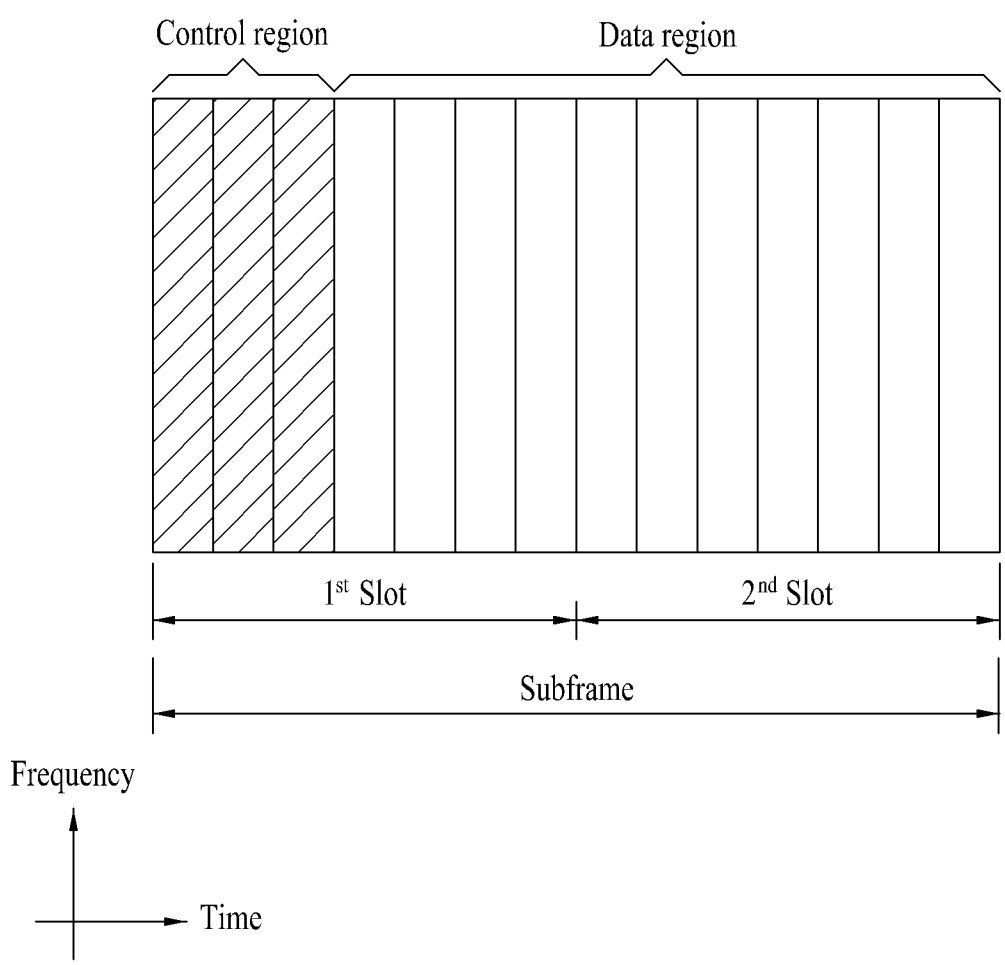
FIG. 4 is a diagram illustrating a structure of a downlink subframe used in an LTE system.

FIG. 4 is a diagram illustrating a structure of a downlink subframe used in the LTE system.

Referring to FIG. 4, maximum three (four) OFDM symbols located at the front of the first slot within one subframe correspond to a control region for allocation of a control channel. The other OFDM symbols correspond to a data region to which a physical downlink shared channel (PDSCH) is allocated, wherein a basic resource unit of the data region is RB. Examples of the downlink control channel used in the LTE include a PCFICH (Physical Control Format Indicator CHannel), a PDCCH (Physical Downlink Control CHannel), and a PHICH (Physical Hybrid ARQ Indicator CHannel). The PCFICH is transmitted from the first OFDM symbol of the subframe, and carries information on the number of OFDM symbols used for transmission of the control channel within the subframe. The PHICH is a response to uplink transmission, and carries HARQ ACK/NACK (acknowledgement/negative-acknowledgement) signal. The PDCCH carries downlink control information (DCI). The DCI may include uplink or downlink scheduling information or uplink transmission power control command for a random user equipment group.

The DCI may include formats 0, 3, 3A and 4 for an uplink and formats 1, 1A, 1B, 1C, 1D, 2, 2A, 2B and 2C for a downlink. A type of information fields, the number of information fields, and the number of bits of each information field are varied depending on the DCI format. For example, the DCI format selectively includes information such as a hopping flag, RB assignment, a modulation coding scheme (MCS), redundancy version (RV), new data indicator (NDI), transmit power control (TPC), a HARQ process number, and precoding matrix indicator (PMI) confirmation in accordance with usage. Accordingly, a size of control information matched with the DCI format is varied depending on the DCI format. Meanwhile, a random DCI format may be used for transmission of two or more kinds of control information. For example, the DCI formats 0 and 1A are used to carry the DCI format 0 or the DCI format 1, and are identified from each other by a flag field.

Figure 5:
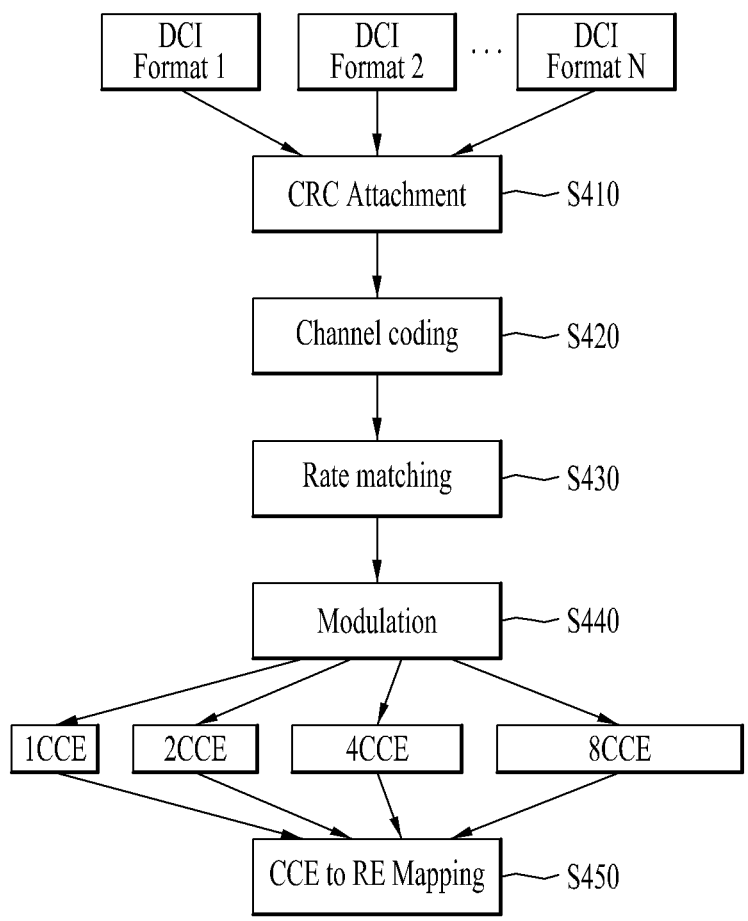
FIG. 5 is a flow chart illustrating a procedure of configuring a PDCCH in a base station.

FIG. 5 is a flow chart illustrating a procedure of configuring a PDCCH in a base station.

Referring to FIG. 5, the base station generates control information in accordance with the DCI format. The base station may select one of a plurality of DCI formats (DCI format 1, 2, . . . , N) in accordance with control information to be transmitted to the user equipment. At step S410, the base station attaches cyclic redundancy check (CRC) for error detection to the control information generated in accordance with each DCI format. The CRC is masked with an identifier (for example, radio network temporary identifier (RNTI)) depending on owner or usage of the PDCCH. In other words, the PDCCH is CRC scrambled with the identifier (for example, RNTI).

Table 3 illustrates an example of identifiers masked in the PDCCH.

TABLE 3

| Type | Identifier | Description |
| --- | --- | --- |
| UE-specific | C-RNTI, temporary C-RNTI, semi-persistent C-RNTI | Used for unique identification of UE |
| Common | P-RNTI | Used for paging message |
|  | SI-RNTI | Used for system information |
|  | RA-RNTI | Used for random access response |

If C-RNTI, temporary C-RNTI or semi-persistent C-RNTI is used, the PDCCH carries the control information for the corresponding specific user equipment. If the other RNTI is used, the PDCCH carries common control information received by all the user equipments within the cell. At step S420, channel coding is performed for the control information with CRC, whereby coded data (codeword) are generated. At step S430, rate matching based on the CCE aggregation level allocated to the PDCCH format is performed. At step S440, the coded data are modulated to generate modulated symbols. The modulated symbols constituting one PDCCH may have one of CCE aggregation levels of 1, 2, 4, and 8. At step S450, the modulated symbols are mapped into physical resource elements (REs) (CCE to RE mapping).

The CCE is a logic allocation unit used to provide a PDCCH of a predetermined coding rate in accordance with the status of a radio channel. The CCE corresponds to a plurality of resource element groups (REGs). The format of the PDCCH and the number of available bits of the PDCCH are determined depending on the correlation between the number of CCEs and the coding rate provided by the CCE. For example, each CCE corresponds to nine sets of four resource elements. Four resource elements will be referred to as a resource element group (REG). Four QPSK symbols are mapped into one REG. A resource element (RE) allocated to the reference signal (RS) is not included in the REG. Accordingly, a total number of REGs within given OFDM symbols are varied depending on the presence of a cell-specific reference signal. The REG concept (that is, group unit mapping, each group includes four resource elements) is used for other downlink control channels (that is, PDFICH and PHICH). In other words, the REG is used in a basic resource unit of the control region. Four PDCCH formats are supported as listed in Table 4.

TABLE 4

| PDCCH format | Number of CCE (n) | Number of REG | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

Figure 6:
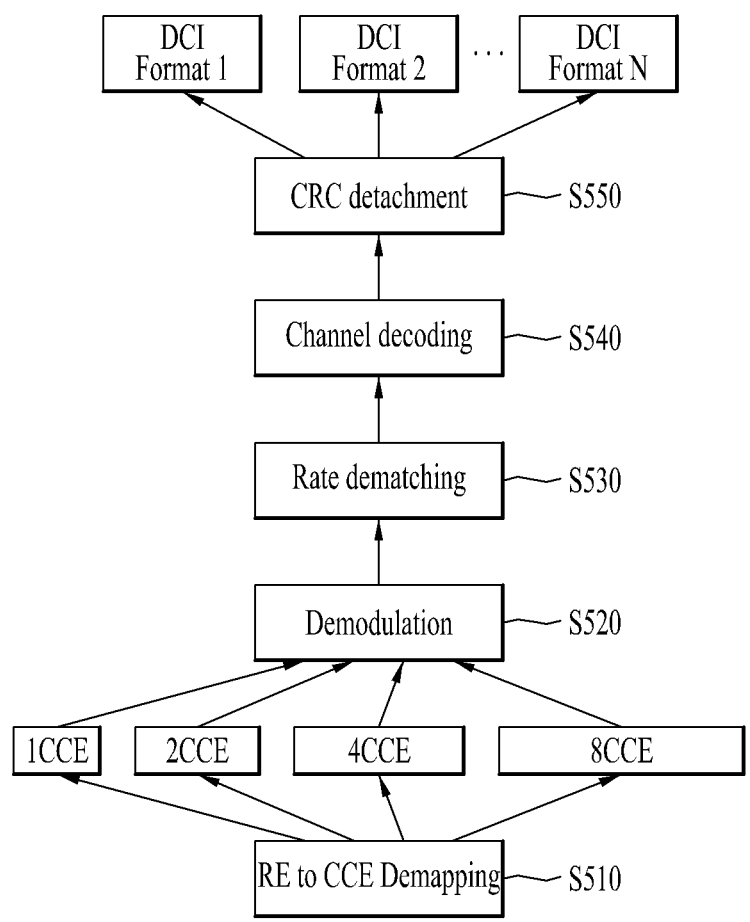
FIG. 6 is a flow chart illustrating a procedure of processing a PDCCH in a user equipment.

FIG. 6 is a diagram illustrating a procedure of processing a PDCCH in a user equipment.

Referring to FIG. 6, the user equipment performs demapping of physical resource elements to CCEs (CCE to RE demapping) at step S510. At step S520, since the user equipment does not know what CCE aggregation level should be used to receive the PDCCH, the user equipment performs demodulation for each CCE aggregation level. At step S530, the user equipment performs rate dematching for the demodulated data. Since the user equipment does not know what DCI format (or DCI payload size) of control information should be received therein, the user equipment performs rate dematching for each DCI format (or DCI payload size). At step S540, the user equipment performs channel decoding for the rate dematched data in accordance with a coding rate, and detects whether an error has occurred, by checking CRC. If an error has not occurred, the user equipment detects its PDCCH. If the error has occurred, the user equipment continues to perform blind decoding for the other CCE aggregation level or the other DCI format (or DCI payload size). At step S550, the user equipment that has detected its PDCCH removes CRC from the decoded data and acquires control information.

A plurality of PDCCHs for a plurality of user equipments may be transmitted within the control region of the same subframe. The base station does not provide the user equipment with information as to where the corresponding PDCCH is within the control region. Accordingly, the user equipment discovers its PDCCH by monitoring an aggregation of PDCCH candidates within the subframe. In this case, monitoring means that the user equipment tries to decode each of the PDCCH candidates in accordance with each DCI format, and will be referred to as blind decoding (or blind detection). Through blind detection, the user equipment performs identification of the PDCCH transmitted thereto and decoding of control information transmitted through the corresponding PDCCH. For example, if the PDCCH is demasked with C-RNTI and there is no CRC error, the user equipment detects its PDCCH.

The LTE system defines location of a limited set of CCEs, where the PDCCH may be located for each user equipment. The location of the limited set of CCEs, where the user equipment may discover its PDCCH, may be referred to as a search space (SS). In the LTE system, the search space may have different sizes depending on each PDCCH format. Also, user equipment specific (UE-specific) and common search spaces are defined separately. The UE-specific search space (USS) is configured separately for each user equipment, and the range of the common search space (CSS) is notified to al the user equipments. The UE-specific search space and the common search space may be overlapped for the given user equipment.

Table 5 illustrates sizes of the common search space and the UE-specific search space.

TABLE 5

| PDCCH format | Number of CCE (n) | Number of candidates in CSS | Number of candidates in USS |
| --- | --- | --- | --- |
| 0 | 1 | — | 6 |
| 1 | 2 | — | 6 |
| 2 | 4 | 4 | 2 |
| 3 | 8 | 2 | 2 |

Also, in order to control calculation load based on a total number of times of blind decoding (BD), the user equipment is not required to search for all the DCI formats, which are defined, at the same time. Generally, the user equipment always searches for formats 0 and 1A within the UE-specific search space. The formats 0 and 1A have the same sizes as each other, and are identified from each other by a flag within a message. Also, the user equipment may be required to receive additional format (for example, format 1, 1B, 2, 2A, 2B or 2C in accordance with a PDSCH transmission mode configured by the base station). The user equipment searches for the formats 1A and 1C in the common search space. Also, the user equipment may be configured to search for the format 3 or 3A. The formats 3 and 3A may have the same sizes as each other, and may be identified from each other by scrambling CRC with (common) identifiers different from each other instead of UE-specific identifier.

The user equipment may be configured semi-statically by higher layer signaling to receive PDSCH data transmission scheduled through the PDCCH in accordance with ten transmission modes. Table 6 illustrates transmission modes signaled by higher layer, DCI formats, which may be configured, and search spaces, when the user equipment searches for the PDCCH scrambled with C-RNTI.

TABLE 6

| Transmission mode | DCI format | Search Space | Transmission scheme of PDSCH corresponding to PDCCH |
| --- | --- | --- | --- |
| Mode 1 | DCI format 1A | Common and UE specific by C-RNTI | Single-antenna port, port 0 (see subclause 7.1.1) |
| | DCI format 1 | UE specific by C-RNTI | Single-antenna port, port 0 (see subclause 7.1.1) |
| Mode 2 | DCI format 1A | Common and UE specific by C-RNTI | Transmit diversity (see subclause 7.1.2) |
| | DCI format 1 | UE specific by C-RNTI | Transmit diversity (see subclause 7.1.2) |
| Mode 3 | DCI format 1A | Common and UE specific by C-RNTI | Transmit diversity (see subclause 7.1.2) |
| | DCI format 2A | UE specific by C-RNTI | Large delay CDD (see subclause 7.1.3) or Transmit diversity (see subclause 7.1.2) |
| Mode 4 | DCI format 1A | Common and UE specific by C-RNTI | Transmit diversity (see subclause 7.1.2) |
| | DCI format 2 | UE specific by C-RNTI | Closed-loop spatial multiplexing (see subclause 7.1.4) or Transmit diversity (see subclause 7.1.2) |
| Mode 5 | DCI format 1A | Common and UE specific by C-RNTI | Transmit diversity (see subclause 7.1.2) |
| | DCI format 1D | UE specific by C-RNTI | Multi-user MIMO (see subclause 7.1.5) |

TABLE 6-continued

| Transmission mode | DCI format | Search Space | Transmission scheme of PDSCH corresponding to PDCCH |
|---|---|---|---|
| Mode 6 | DCI format 1A | Common and UE specific by C-RNTI | Transmit diversity (see subclause 7.1.2) |
|  | DCI format 1B | UE specific by C-RNTI | Closed-loop spatial multiplexing (see subclause 7.1.4) using a single transmission layer |
| Mode 7 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |
|  | DCI format 1 | UE specific by C-RNTI | Single-antenna port, port 5 (see subclause 7.1.1) |
| Mode 8 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |
|  | DCI format 2B | UE specific by C-RNTI | Dual layer transmission, port 7 and 8 (see subclause 7.1.5A) or single-antenna port, port 7 or 8 (see subclause 7.1.1) |
| Mode 9 | DCI format 1A | Common and UE specific by C-RNTI | Non-MBSFN subframe: If the number of PBCH antenna ports is one, Single-antenna port, port 0 is used (see subclause 7.1.1), otherwise Transmit diversity (see subclause 7.1.2) MBSFN subframe: Single-antenna port, port 7 (see subclause 7.1.1) |
|  | DCI format 2C | UE specific by C-RNTI | Up to 8 layer transmission, ports 7-14 (see subclause 7.1.5B) or single-antenna port, port 7 or 8 (see subclause 7.1.1) |
| Mode 10 | DCI format 1A | Common and UE specific by C-RNTI | Non-MBSFN subframe: If the number of PBCH antenna ports is one, Single-antenna port, port 0 is used (see subclause 7.1.1), otherwise Transmit diversity (see subclause 7.1.2) MBSFN subframe: Single-antenna port, port 7 (see subclause 7.1.1) |
|  | DCI format 2D | UE specific by C-RNTI | Up to 8 layer transmission, ports 7-14 (see subclause 7.1.5B) or single-antenna port, port 7 or 8 (see subclause 7.1.1) |

The user equipment detects the PDCCH in accordance with each combination defined in Table 6, and receives the PDSCH corresponding to the detected PDCCH. In other words, the user equipment may detect a DCI format from the corresponding search space in accordance with the transmission mode signaled by higher layer and receive data by varying a transmission scheme of the PDSCH.

In case of a transmission mode 8 (TM 8), the DCI format which is detected may be divided into a DCI format 1A and a DCI format 2B. If the DCI detected by the user equipment is the format 1A, the search space may be set to a common search space (CSS) and a UE specific search space (USS) based on cell radio-network temporary identifier (C-RNTI). Moreover, the PDSCH transmission scheme is configured to use port #0 if the number of antenna ports of a physical broadcast channel (PBCH) is one, that is, in case of a single antenna port, and is configured to use a transmit diversity scheme in other cases. If the DCI format detected by the user equipment is 2B, the search space is set to the UE specific search space (USS) based on the C-RNTI. Also, the user equipment may be configured to use a dual layer transmission scheme based on antenna ports #7 and #8 or a single antenna port scheme based on antenna ports #7 and #8.

In case of the user equipment set to a transmission mode 9 (TM 9), the DCI format which is detected may be divided into a DCI format 1A and a DCI format 2C. If the DCI detected by the user equipment is the format 1A, the search space may be set to a common search space (CSS) and a UE specific search space (USS) based on cell radio-network temporary identifier (C-RNTI). If the DCI detected by the user equipment set to the TM 9 has the format DCI format 1A, the PDSCH transmission scheme is configured differently depending on multimedia broadcast single frequency network (MBSFN) subframe. In case of the MBSFN subframe, the PDSCH transmission mode is configured to use port #0 when the number of antenna ports of a physical broadcast channel (PBCH) is one, that is, in case of a single antenna port, and is configured to use a transmit diversity scheme in other cases. If case of no MBSFN subframe, the PDSCH transmission scheme is configured to use antenna port #7 as a single antenna port.

If the DCI format detected by the user equipment set to the TM 9 is 2C, the search space is set to a UE specific search space based on C-RNTI. At this time, the PDSCH transmission scheme may be configured to use maximum eight layers corresponding to antenna ports #7 to 14 or use a single antenna port of antenna port #7 or #8.

In case of the user equipment set to a transmission mode 10 (TM 10), the DCI format which is detected may be divided into a DCI format 1A and a DCI format 2D. If the DCI detected by the user equipment is the format 1A, the same description as that of the transmission mode 9 may be applied to the DCI format 1A. If the DCI format 2D is detected, the same description as that of the DCI format 2C in the transmission mode 9 may be applied to the DCI format 2D.

Table 7 illustrates transmission modes signaled by higher layer, DCI formats, which may be configured, and search spaces, when the user equipment detects the PDCCH scrambled with semi-persistent C-RNTI.

TABLE 7

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 (see subclause 7.1.1) |
|  | DCI format 1 | UE specific by C-RNTI | Single-antenna port, port 0 (see subclause 7.1.1) |
| Mode 2 | DCI format 1A | Common and UE specific by C-RNTI | Transmit diversity (see subclause 7.1.2) |
|  | DCI format 1 | UE specific by C-RNTI | Transmit diversity (see subclause 7.1.2) |
| Mode 3 | DCI format 1A | Common and UE specific by C-RNTI | Transmit diversity (see subclause 7.1.2) |
|  | DCI format 2A | UE specific by C-RNTI | Transmit diversity (see subclause 7.1.2) |
| Mode 4 | DCI format 1A | Common and UE specific by C-RNTI | Transmit diversity (see subclause 7.1.2) |
|  | DCI format 2 | UE specific by C-RNTI | Transmit diversity (see subclause 7.1.2) |
| Mode 5 | DCI format 1A | Common and UE specific by C-RNTI | Transmit diversity (see subclause 7.1.2) |
| Mode 6 | DCI format 1A | Common and UE specific by C-RNTI | Transmit diversity (see subclause 7.1.2) |
| Mode 7 | DCI format 1A | Common and UE specific by C-RNTI | Single-antenna port, port 5 (see subclause 7.1.1) |
|  | DCI format 1 | UE specific by C-RNTI | Single-antenna port, port 5 (see subclause 7.1.1) |
| Mode 8 | DCI format 1A | Common and UE specific by C-RNTI | Single-antenna port, port 7(see subclause 7.1.1) |
|  | DCI format 2B | UE specific by C-RNTI | Single-antenna port, port 7 or 8 (see subclause 7.1.1) |
| Mode 9 | DCI format 1A | Common and UE specific by C-RNTI | Single-antenna port, port 7 (see subclause 7.1.1) |
|  | DCI format 2C | UE specific by C-RNTI | Single-antenna port, port 7 or 8, (see subclause 7.1.1) |
| Mode 10 | DCI format 1A | Common and UE specific by C-RNTI | Single-antenna port, port 7 (see subclause 7.1.1) |
|  | DCI format 2D | UE specific by C-RNTI | Single-antenna port, port 7 or 8, (see subclause 7.1.1) |

Table 8 illustrates DCI formats, which may be configured, and search spaces, when the user equipment detects the PDCCH scrambled with temporary C-RNTI.

TABLE 8

| DCI format | Search Space | Transmission scheme of PDSCH corresponding to PDCCH |
|---|---|---|
| DCI format 1A | Common and UE specific by Temporary C-RNTI | If the number of PBCH antenna port is one, Single-antenna port, port 0 is used, otherwise Transmit diversity |
| DCI format 1 | UE specific by Temporary C-RNTI | If the number of PBCH antenna port is one, Single-antenna port, port 0 is used, otherwise Transmit diversity |

The transmission mode 10 may be used in a coordinated multi-point (CoMP) system. A CoMP scheme, which may be applied to a downlink, may include a joint transmission (JT) scheme, a coordinated scheduling/beamforming (CS/CB) scheme, and a dynamic cell selection (DCS) scheme.

The joint transmission (JT) scheme means that a downlink signal (for example, PDSCH and PDCCH) is transmitted from a plurality of points (some or all of points (for example, base station) which join CoMP operation) at one time. In other words, data transmitted to a single user equipment may be transmitted from a plurality of transmission points at the same time. According to the joint transmission scheme, quality of a received signal may be improved coherently or non-coherently, and interference on another user equipment may be removed actively.

The dynamic cell selection scheme means that a PDSCH is transmitted from one point (of points which join CoMP operation) at one time. In other words, data transmitted to a single user equipment at a specific time are transmitted from one point. Another point within the points which join CoMP operation may not perform data transmission to the corresponding user equipment at the specific time, and the point which transmits data to the corresponding user equipment may be selected dynamically.

In the meantime, according to the CS/CB scheme, points which join CoMP operation may cooperatively perform beamforming of data transmission to a single user equipment. In this case, although the data are transmitted from a serving point only, user scheduling/beamforming may be determined by coordination of the points which join the corresponding CoMP operation.

In the meantime, in case of an uplink, coordinated multi-point reception means that a signal is received by coordination of a plurality of points locally spaced apart from one another. A CoMP scheme that may be applied to the uplink may be classified into a joint reception (JR) scheme and a coordinated scheduling/beamforming (CS/CB) scheme.

The JR scheme means that a signal transmitted through a PUSCH is received from a plurality of reception points. The CS/CB scheme means that a PUSCH is received from one point only but user scheduling/beamforming is performed.

If the CoMP system is used, the user equipment may be supported with data in common from multi-cell base stations. Also, each base station may improve system throughput by supporting the same radio frequency resource for one or more user equipments at the same time. Also, the base station may perform a space division multiple access (SDMA) method on the basis of channel state information with the user equipment.

In the CoMP system, the serving base station may be connected with one or more cooperative base stations through a backbone network. The scheduler may be operated in accordance with a feedback of channel information on the channel state between each user equipment and the cooperative base station through the backbone network, wherein the channel state is measured by each base station. For example, the scheduler may schedule information for cooperative MIMO operation for the serving base station and one or more cooperative base stations. In other words, the scheduler may directly command each base station to perform the cooperative MIMO operation.

Figure 7:
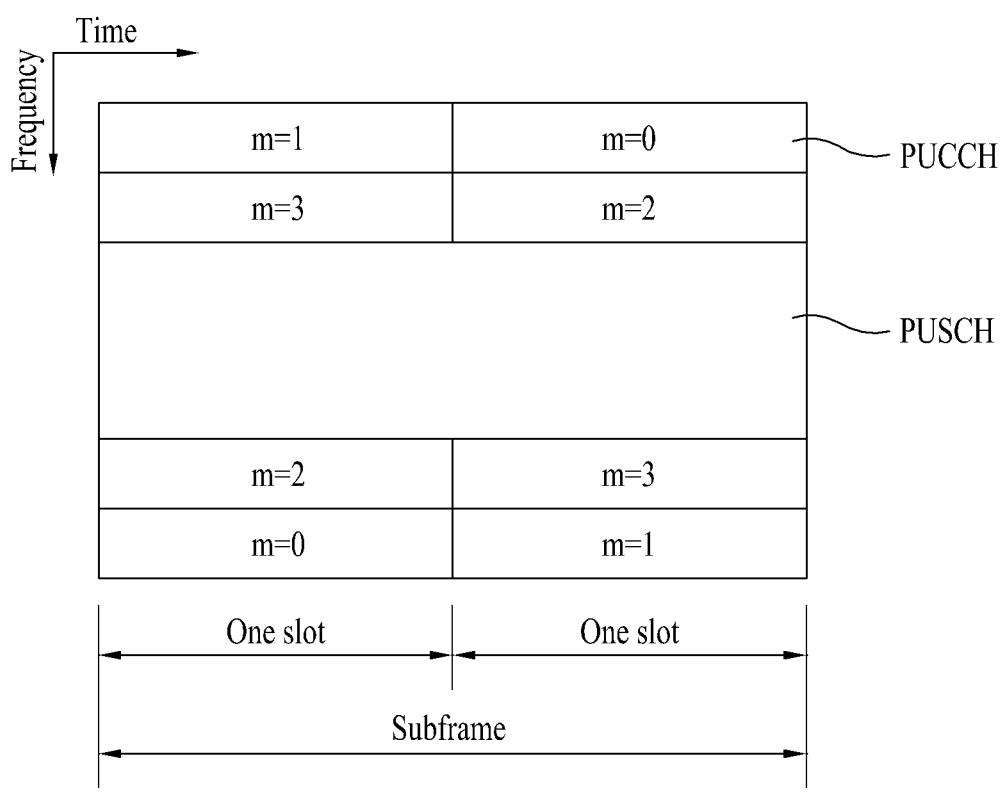
FIG. 7 is a diagram illustrating a structure of an uplink subframe used in an LTE system.

FIG. 7 is a diagram illustrating a structure of an uplink subframe used in an LTE system.

Referring to FIG. 7, the uplink subframe includes a plurality of slots (for example, two). Each slot may include a plurality of SC-FDMA symbols, wherein the number of SC-FDMA symbols included in each slot is varied depending on a cyclic prefix (CP) length. For example, in case of a normal CP, the slot may include seven SC-FDMA symbols. The uplink subframe is divided into a data region and a control region in a frequency domain. The data region includes a PUSCH, and is used to transmit a data signal such as voice. The control region includes a PUCCH, and is used to transmit control information. The PUCCH includes RB pair (for example, m=0, 1, 2, 3) located at both ends of the data region on a frequency axis, and performs hopping on the border of the slots. The control information includes HARQ ACK/NACK, channel quality information (CQI), precoding matrix indicator (PMI), and rank indication (RI).

Figure 8:
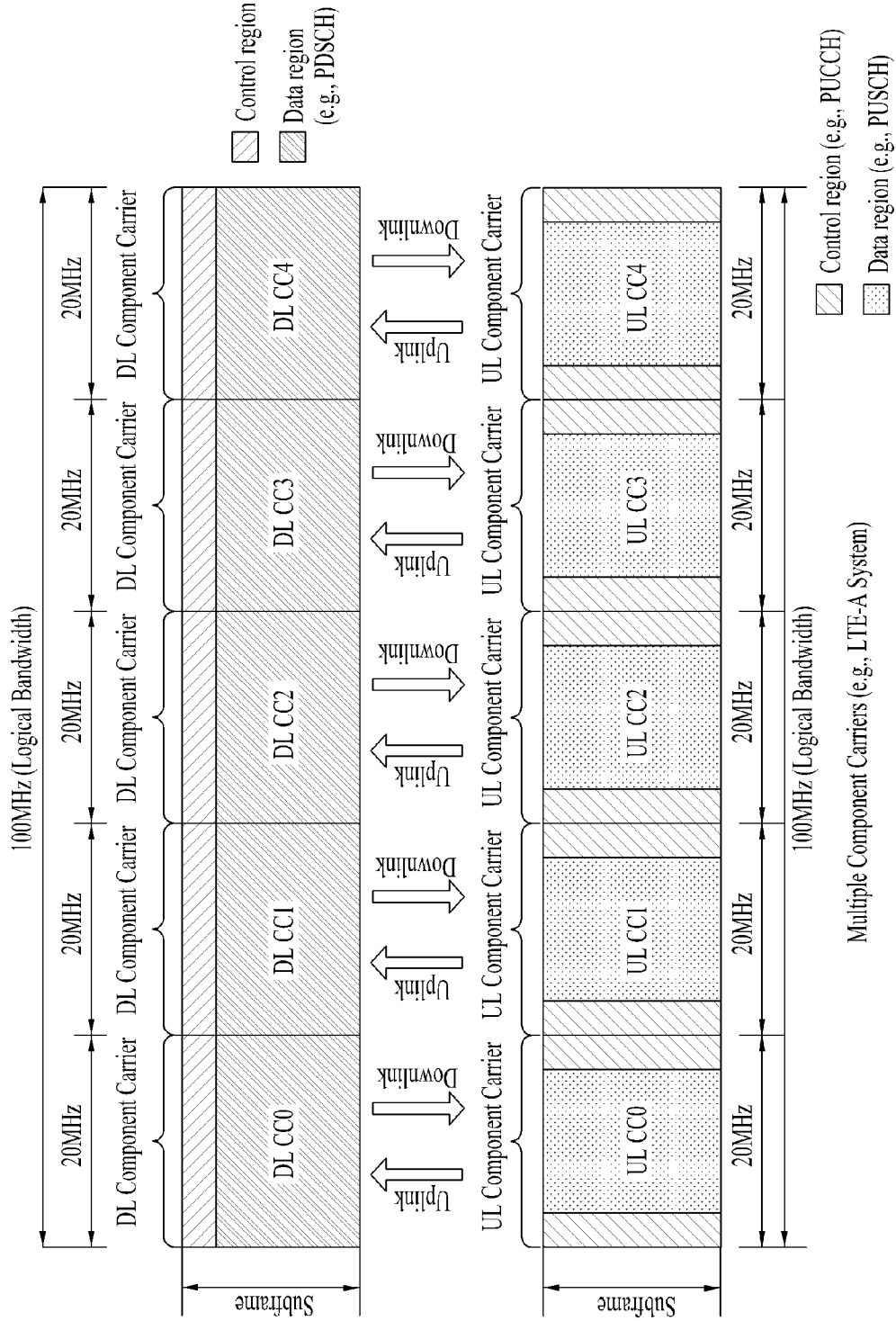
FIG. 8 is a diagram illustrating a carrier aggregation (CA) communication system.

FIG. 8 is a diagram illustrating a carrier aggregation (CA) communication system.

Referring to FIG. 8, a plurality of uplink/downlink component carriers (CC) may be collected to support wider uplink/downlink bandwidths. The respective CCs may adjoin each other or not in the frequency domain. A bandwidth of each component carrier may be defined independently. Asymmetric carrier aggregation where the number of UL CCs is different from the number of DL CCs may be performed. Meanwhile, the control information may be set to be transmitted and received through a specific CC only. This specific CC may be referred to as a primary CC (PCC), and the other CCs may be referred to as secondary CCs, For example, if cross-carrier scheduling (or cross-CC scheduling) is used, the PDCCH for downlink allocation is transmitted to DL CC#0, and the corresponding PDSCH may be transmitted to DL CC#2. The terminology "component carrier" may be replaced with an equivalent another terminology (for example, carrier, cell, etc.).

For cross-carrier scheduling, a carrier indicator field (CIF) is used. Configuration of the presence or not of the CIF within the PDCCH may be enabled by higher layer signaling (for example, RRC signaling) semi-statically and user equipment-specifically (or user equipment group-specifically). The base line of PDCCH transmission may be summed up as follows.

CIF disabled: the PDCCH on the DL CC allocates PDSCH resource on the same DL CC or PUSCH resource on one linked UL CC.
No CIF
CIF enabled: the PDCCH on the DL CC may allocate PDSCH or PUSCH resource on one DL/UL CC of a plurality of aggregated DL/UL CCs by using the CIF.
LTE DCI format extended to have CIF
CIF (if configured) is a fixed x-bit field (for example, x=3)
CIF (if configured) location is fixed regardless of DCI format size.

If the CIF exists, the base station may allocate a PDCCH monitoring DL CC (set) to reduce complexity of blind detection in view of the user equipment. For PDSCH/PUSCH scheduling, the user equipment may detect and decode the PDCCH on the corresponding DL CC only. Also, the base station may transmit the PDCCH through monitoring DL CC (set) only. The monitoring DL CC set may be configured user equipment-specifically, user equipment group-specifically or cell-specifically.

Figure 9:
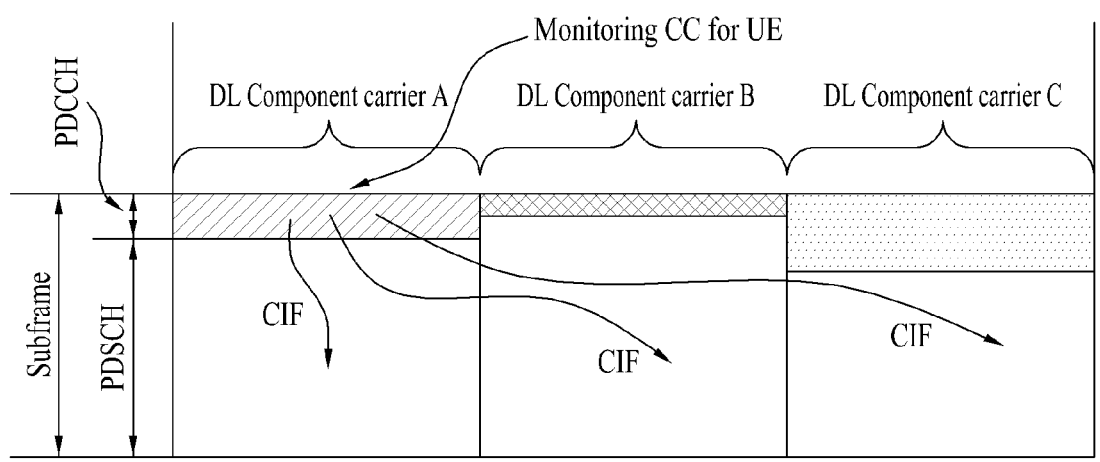
FIG. 9 is a diagram illustrating cross-carrier scheduling.

FIG. 9 illustrates that three DL CCs are aggregated and DL CC A is set to a monitoring DL CC. If the CIF is disabled, each DL CC may transmit the PDCCH that schedules a PDSCH of each DL CC without CIF in accordance with the LTE PDCCH rule. On the other hand, if the CIF is enabled by higher layer signaling, only the DL CC A may transmit the PDCCH, which schedules the PDSCH of another CC as well as the PDSCH of the DL CC A, by using the CIF. The PDCCH is not transmitted from the DL CC B and DL CC C which are not set to the PDCCH monitoring DL CC.

As described above, in the 3GPP LTE/LTE-A system, first n number of OFDM symbols of the subframe are used for transmission of PDCCH, PHICH, and PCFICH, which are physical channels for transmission of various kinds of control information, and the other OFDM symbols are used for PDSCH transmission. The number of symbols used for control channel transmission for each subframe is forwarded to the user equipment dynamically through the physical channel such as PCFICH, or semi-statically through RRC signaling. The value of n may be set to one symbol to maximum four symbols in accordance with subframe features and system features (FDD/TDD, system band, etc.). Meanwhile, in the LTE system according to the related art, the PDCCH which is a physical channel for DL/UL scheduling and transmitting various kinds of control information has limitation in that the PDCCH is transmitted through limited OFDM symbol(s). Accordingly, introduction of an enhanced PDCCH (E-PDCCH) multiplexed with the PDSCH more freely in accordance with FDM/TDM mode may be considered instead of the control channel structure that the existing PDCCH is transmitted through the OFDM symbol separate from the PDSCH.

Figure 10:
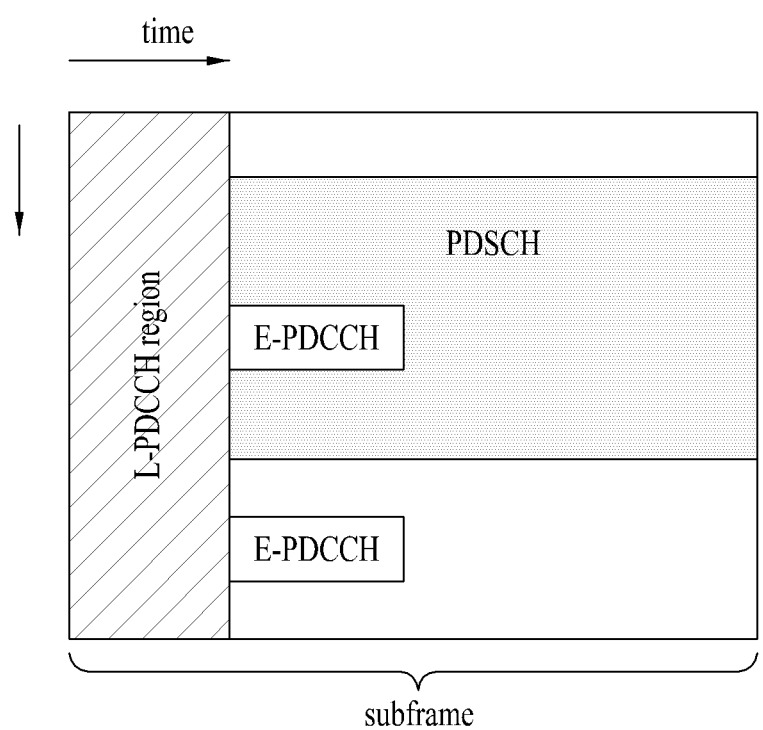
FIG. 10 is a diagram illustrating an example of allocating a PDCCH to a data region of a subframe.

FIG. 10 is a diagram illustrating an example of allocating a downlink physical channel to a subframe if E-PDCCH is used.

Referring to FIG. 10, a PDCCH (for convenience, legacy PDCCH) according to the LTE/LTE-A system of the related art may be allocated to the control region of the subframe. In FIG. 10, an L-PDCCH region means a region to which the legacy PDCCH may be allocated. The L-PDCCH region may mean the control region, a control channel resource region (that is, CCE resource) to which the PDCCH may actually be allocated within the control region, or a PDCCH search space. Meanwhile, the PDCCH may additionally be allocated to the data region (for example, resource region for PDSCH, see FIG. 4). The PDCCH allocated to the data region will be referred to as E-PDCCH. FIG. 10 illustrates that one E-PDCCH is configured for one slot. However, FIG. 10 is only exemplary, and the E-PDCCH may exist in a unit of subframe (that is, over two slots). Alternatively, the E-PDCCH may exist in a unit of subframe or a unit of slot.

As illustrated in FIG. 10, the existing L-PDCCH and PDSCH may be multiplexed with the E-PDCCH. At this time, information as to whether the PDCCH is transmitted through either the L-PDCCH region or the E-PDCCH region (that is, information as to whether a search space (SS) for PDCCH detection is configured for either the L-PDCCH region or the E-PDCCH region) may be configured semi-statically through higher layer signaling (for example, RRC signaling).

FIG. 11 is a diagram illustrating a pattern of a reference signal mapped into a downlink resource block (RB) pair in an LTE system.

In a mobile communication system, since a packet is transmitted through a radio channel, signal distortion may occur during transmission of the packet. In order to normally receive the distorted signal in a receiving side, it is required to discover channel information so that distortion of the received signal may be compensated using the channel information. In order to discover the channel information, it is required to transmit the signal known by both a transmitting side and the receiving side and discover the channel information using a distortion level of the signal when the signal is transmitted through the channel. In this case, the signal known by both the transmitting side and the receiving side will be referred to as a pilot signal or a reference signal.

Also, when transmitting a packet, most of the mobile communication systems recently use a method for improving data efficiency in transmission and reception by adopting multiple transmitting antennas and multiple receiving antennas instead of one transmitting antenna and one receiving antenna which have been used until now. In case that the transmitting side or the receiving side of the mobile communication system transmits and receives data by using multiple antennas to increase capacity or improve throughput, a separate reference signal per transmitting antenna should be provided to know a channel state between each transmitting antenna and each receiving antenna, thereby receiving a normal signal.

In the mobile communication system, the reference signal (RS) may include a reference signal used for acquisition of channel information and a reference signal used for data demodulation in accordance with its purpose. Since the reference signal for acquisition of channel information is intended for acquisition of channel information on the downlink through the user equipment, it may be transmitted through a wideband, and may be received and measured even by a user equipment that does not receive downlink data for a specific subframe. Also, this reference signal may be used for measurement of handover. The reference signal for data demodulation is transmitted from the base station together with a corresponding resource when the base station transmits downlink data. In this case, the user equipment may perform channel measurement by receiving the corresponding reference signal, and may demodulate the data. This reference signal for data demodulation may be transmitted to a region to which data are transmitted.

In the release-8 LTE system, two types of downlink reference signals are defined for unicast service. One of the reference signals is a common reference signal (CRS) for acquisition of channel state information and measurement of handover, and the other one is a UE-specific reference signal which is a dedicated RS (DRS) used for data demodulation. In the Release 8 LTE system, the UE-specific reference signal is used for data demodulation only, and the CRS is used for both acquisition of channel information and data demodulation. The CRS is the cell-specific reference signal, and the base station transmits the CRS per subframe through a wideband. In this specification, the CRS may be referred to as a cell-specific RS. The cell-specific CRS may be transmitted for maximum four antenna ports depending on the number of transmitting antennas of the base station. For example, if the number of transmitting antennas of the base station is two, the CRS for the antenna ports 0 and 1 are transmitted. If the number of transmitting antennas is four, the CRS for the antenna ports 0 to 3 are respectively transmitted.

Referring to FIG. 11, resource elements (REs) expressed as '0', '1', '2' and '3' in each resource block respectively represent resource elements to which the CRS corresponding to each of antenna ports 0, 1, 2 and 3 of the transmitting end (for example, base station) is mapped, and the resource elements expressed as 'D' represent resource elements to which the DRS is mapped.

The LTE-A system which is an evolved version of the LTE system may support maximum eight transmitting antennas for downlink transmission of the base station. To this end, reference signals for maximum eight transmitting antennas are also supported. In the LTE system, since downlink reference signals are defined for maximum four antenna ports, if the base station includes minimum four downlink transmitting antennas to maximum eight downlink transmitting antennas in the LTE-A system, reference signals for these antenna ports are defined and designed additionally. The reference signals for maximum eight transmitting antenna ports should be considered for two types of reference signals, i.e., reference signal for channel measurement and reference signal for data demodulation.

Figure 12:
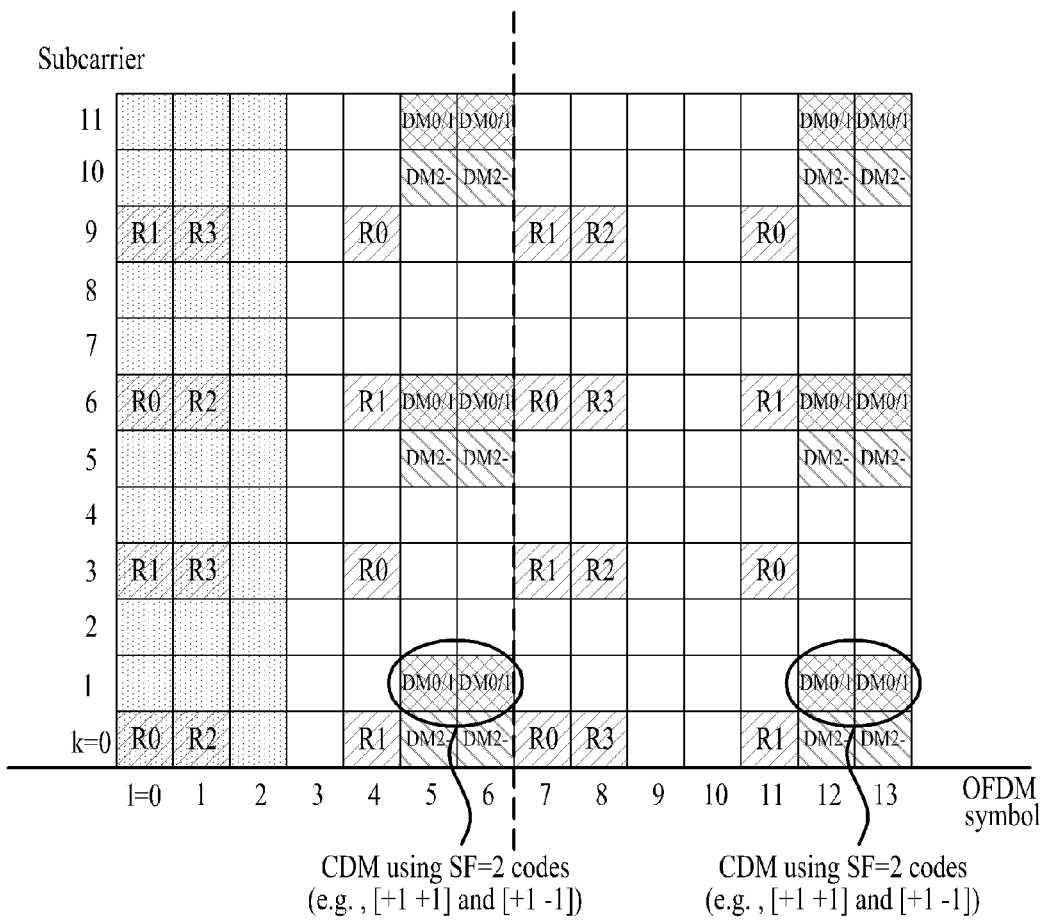
FIG. 12 is a diagram illustrating a structure of a demodulation reference signal (DM RS) added in an LTE-A system.

FIG. 12 is a diagram illustrating a structure of a demodulation reference signal (DM RS) added in an LTE-A system. The DM RS is the user equipment-specific reference signal used to demodulate a signal of each layer if multiple antennas are used. The DM RS is used for demodulation of the PDSCH. Since the LTE-A system considers maximum eight transmitting antennas, maximum eight layers and each DM RS for the maximum eight layers will be required.

Referring to FIG. 12, the DM RS is multiplexed with the same RE shared by two or more layers in accordance with a code division multiplexing (CDM) scheme. In more detail, the DM RS for each layer are spread using a spreading code (for example, Walsh code, orthogonal code such as DFT code) and then multiplexed on the same RE. For example, the DM RS for layers 0 and 1 share the same RE, and are spread on two REs of OFDM symbols 12 and 13 for a subcarrier 1 (k=1) by using an orthogonal code. In other words, at each slot, the DM RS for the layers 0 and 1 are spread along a time axis by using a spreading factor (SF)=2 code and then multiplexed with the same RE. For example, the DM RS for the layer 0 may be spread using [+1 +1], and the DM RS for the layer 1 may be spread using [+1−1]. Similarly, the DM RS for layers 2 and 3 are spread on the same RE by using different orthogonal codes. The DM RS for layers 4, 5, 6 and 7 are spread on the RE reserved by DM RS 0 and 1 and DM RS 2 and 3 by using codes orthogonal to the existing layers 0, 1, 2 and 3. SF=2 code is used for the DM RS until four layers, and SF=4 code is used for the DM RS if five or more layers are used. In the LTE-A system, the antenna port for the DM RS is {7, 8, . . . , n+6} (n is the number of layers).

In the meantime, one of the important considerations in the LTE-A system is backward compatibility. In other words, the LTE user equipment should be compatible even in the LTE-A system. In view of transmission of the reference signal (RS), the reference signals for maximum eight transmitting antenna ports may additionally be defined in the time-frequency domain where the CRS defined in the LTE system is transmitted to a full band per subframe. However, if the reference signal pattern for the maximum eight transmitting antennas is added to the full band per subframe in the LTE-A system in the same manner as the CRS of the existing LTE system, RS overhead may be too increased. Accordingly, the reference signal newly designed in the LTE-A system may be divided into two types, that is, a channel state information-reference signal (CSI-RS) (or channel state indication-RS) for channel measurement to select a modulation and coding scheme (MCS), a precoding matrix index (PMI), etc., and a data demodulation-reference signal (DM-RS) for data demodulation. The CSI-RS is characterized in that it is designed for channel measurement unlike the existing CRS used for data demodulation simultaneously with channel measurement and measurement of handover. Also, the CSI-RS may be used for measurement of handover, etc. Since the CSI-RS is transmitted to obtain channel state information, the CSI-RS may not be transmitted per subframe unlike the CRS. In order to reduce overhead of the CSI-RS, the CSI-RS is intermittently transmitted on the time axis, and a dedicated DM-RS is transmitted to a scheduled user equipment on the corresponding time-frequency domain to perform data demodulation. In other words, the DM-RS of a specific user equipment may be transmitted to only a region where the corresponding user equipment is scheduled, that is, the time-frequency domain where data may be received. Accordingly, the DM-RS may be referred to as UE-specific RS.

As described above, the CRS (Common Reference Signal or Cell-specific Reference Signal) and a control channel such as PCFICH/PDCCH/PHICH may be transmitted through all the downlink subframes for a random carrier except for a downlink subframe set for a specific purpose (for example, MBSFN (Multicast Broadcast Single Frequency Network)) in the 3GPP LTE(-A) system (for example, Release-8, 9, 10). The CRS may be allocated to all the OFDM symbols of the subframe, and the control channel such as PCFICH/PDCCH/PHICH may be allocated to some of the OFDM symbols at the front on the time axis of the subframe. Such CRS and control channels may assure backward compatibility for access of the existing user equipment and service offer. However, it may be difficult to improve inter-cell interference problem while maintaining backward compatibility with the existing LTE system, improve carrier extendability, or provide advanced features. Accordingly, in next release system, the introduction of a new type carrier may be considered, which does not support all or some of a backward compatible signal/channel as described above to provide more advanced features than those of the existing LTE system. In this specification, a carrier type which is not compatible with the existing LTE system will be defined as a new carrier type (NCT). Also, a carrier which is compatible with the existing LTE(-A) system will be defined as a legacy carrier.

In view of transmission of the reference signal, the legacy carrier may be characterized in that the reference signal (for example, Cell-specific Reference Signal or Cell-common Reference Signal, CRS) is transmitted to a full-band of some OFDM symbols of at least a front side of all the subframes. The NCT carrier may be characterized in that the reference signal (for example, CRS) is transmitted only for some subframe and/or some frequency resources. Although the reference signal transmitted through the NCT carrier is described as the CRS in comparison with the legacy carrier, the CRS actually transmitted through the NCT carrier may be the RS having the same configuration as that of the CRS, the RS having a configuration similar to that of the CRS, or the RS newly defined for the NCT carrier. Also, the CRS in case of the NCT carrier may be used for time/frequency synchronization. In this case, the CRS transmitted through the NCT may be referred to as a tracking RS.

Accordingly, in case of the NCT carrier, fixed CRS transmission which basically has high resource allocation density may be omitted or reduced drastically. In other words, downlink data reception and channel state measurement based on the CRS may not be performed or may be performed within the minimum range for additional purpose. Instead, downlink data may be received on the basis of the DM-RS transmitted by being precoded UE-specifically through the NCT carrier, and the channel state may be measured on the basis of CSI-RS which is configurable with relatively low resource allocation density. This may improve downlink reception throughput and minimize RS overhead, thereby enabling efficient use of downlink resources. Accordingly, it may be considered to perform downlink data scheduling through the NCT carrier by operating only the transmission modes (for example, TM 8, TM 9 or TM 10) based on the DM-RS among the aforementioned downlink transmission modes (TM). In this case, the downlink transmission mode at the user equipment with the NCT carrier may be set to the DM-RS based transmission mode such as TM 8, TM 9 and TM 10.

In the meantime, synchronization/tracking and various measurements may be required for the NCT. In this case, for efficient use of downlink resources, a method for partially transmitting a CRS (Common RS) for synchronization, tracking, measurement, or their combination on a time and/or frequency domain may be considered. For example, the CRS in the legacy carrier may be transmitted for synchronization, tracking and demodulation to a full band per subframe, whereas the CRS in the NCT carrier may be transmitted for tracking at a period of constant subframe.

If the CRS is partially transmitted through the NCT carrier, the CRS may be transmitted through a specific antenna port. For example, the CRS may partially be transmitted on the time at a specific period for k number (for example, k=1) of subframe intervals. For example, the CRS may be transmitted for the subframe number 0 and the subframe number 5 of every radio frame. For another example, the CRS may partially be transmitted from a region corresponding to specific n (for example, n=6) RB pairs on the frequency. For still another example, although the CRS may be transmitted per subframe of a specific period on the time, it may be transmitted to the full band on the frequency.

If the CRS is partially transmitted as above, considering the RS which may be used for downlink data scheduling/reception, it may be preferable that the user equipment receives/demodulates downlink data by using the CRS or the DM-RS at a time interval (for example, subframe interval)/frequency domain (for example, RB region) set to transmit the CRS, whereas the user equipment receives/demodulates downlink data by using the DM-RS only at the time interval/frequency domain where the CRS is not transmitted.

Accordingly, the present invention suggests transmission mode (TM) configuration for efficient downlink data scheduling/reception through the NCT carrier through which the CRS is transmitted partially on the time/frequency and DCI format operation related to the transmission mode configuration.

First of all, types of the DCI formats will be defined. DCI formats specialized in each of the transmission modes (TM) will be defined as TM-dedicated DCI formats, and DCI format set commonly for all the transmission modes (TM) will be defined as a TM-common DCI format. For example, the DCI format 2B may be the TM-dedicated DCI format in case of the TM 8, the DCI format 2C may be the TM-dedicated DCI format in case of the TM 9, and the DCI format 2D may be the TM-dedicated DCI format in case of the TM 10. Also, for example, the DCI format 1A may be the TM-common DCI format.

Also, for convenience of description, a time/frequency domain where the CRS is transmitted on the NCT carrier will be defined as a CRS-configured region, and the other time/frequency domain will be defined as a CRS-less region. For example, if the CRS is transmitted through a specific n number of RBs (or RB pairs) at a period of k subframes by starting from a specific subframe #m, a region corresponding to a specific n number of RBs (or RB pairs) for the subframe #(m+h*k) (h=0, 1, . . . ) may be the CRS-configured region, and the other time/frequency domain may be the CRS-less region.

Based on the above description, the transmission mode (TM) or the DCI, which may be configured for downlink data scheduling through the NCT, and RS combination for downlink data scheduling/reception, which is related to the transmission mode or the DCI format, may be described as follows in accordance with the embodiment of the present invention. In more detail, the present invention suggests a method for scheduling/receiving downlink data related to TM-common DCI format configured in the NCT. In case of TM-dedicated DCI format configured in the NCT, downlink data scheduling/reception may be performed preferably by using the DM-RS only for all the downlink subframes in the same manner as the related art.

Hereinafter, although the embodiments will be described independently, a new embodiment may be configured by combination of two or more embodiments. Also, as the respective embodiments may be more subdivided, some configuration may be omitted.

First Embodiment

Figure 13:
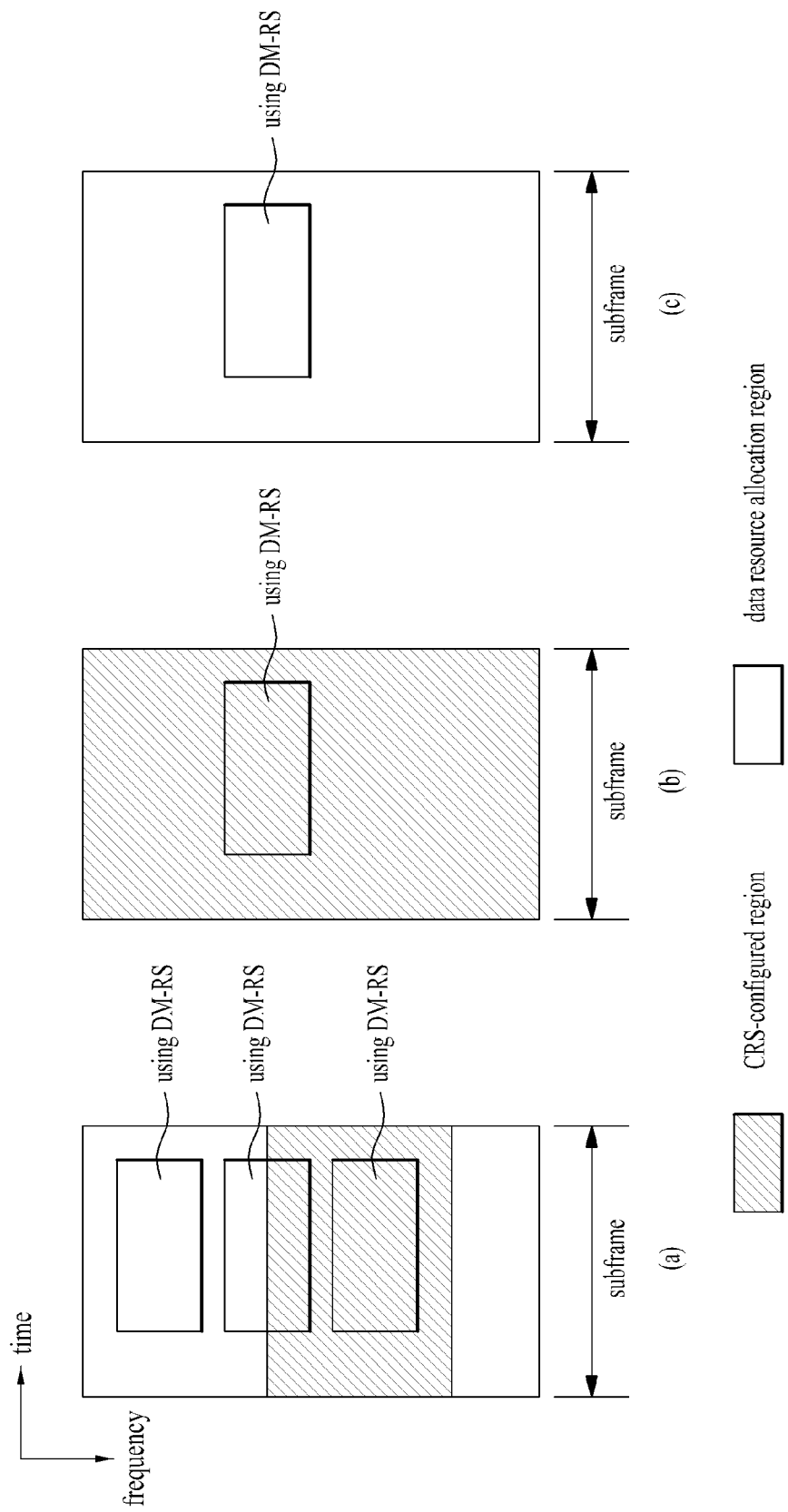
FIG. 13 is a diagram illustrating a method for receiving downlink data according to the first embodiment of the present invention.

FIG. 13 is a diagram illustrating a method for receiving downlink data according to the first embodiment of the present invention. The method (hereinafter, referred to as "method 1") according to the first embodiment of the present invention is that downlink data are scheduled/received using a DM-RS only of a single antenna port for downlink subframe/RB region regardless of a region where the CRS is transmitted during scheduling through the TM-common DCI format (that is, regardless of CRS-configured region or CRS-less region) and regardless of a subframe set for a specific purpose of use (for example, MBSFN).

Referring to FIG. 13($a$), if the CRS-configured region is configured for a part of a full frequency band at the subframe, the user equipment may receive the downlink data by using the DM RS only of the single antenna port regardless that a region (marked with a solid line) scheduled with a downlink data channel is included in the CRS-configured region.

Referring to FIG. 13($b$), even in the case that the CRS-configured region is configured for the full frequency band at the subframe, the user equipment may receive the downlink data by using the DM-RS only of the single antenna port.

Referring to FIG. 13($c$), if the CRS-less region is only configured at the subframe, the user equipment may receive the downlink data by using the DM RS only of the single antenna port.

As an example of the method 1, the transmission mode for downlink data transmission may be set to TM 8 by the base station at the NCT carrier. At this time, if the downlink data are scheduled through the TM-dedicated DCI format (for example, DCI format 2B), the user equipment may receive the downlink data by using the DM-RS transmitted through antenna port 7 and/or 8. If the downlink data are scheduled through the TM-common DCI format (for example, DCI format 1A), the user equipment may receive the downlink data by using the DM-RS transmitted through the antenna port 7 (or 8). In case of the TM-common DCI format (for example, DCI format 1A), the user equipment may receive the downlink data by using the CRS transmitted through the transmit diversity scheme or single antenna port 0 at the legacy carrier.

As another example of the method 1, the transmission mode for downlink data transmission may be set to TM 9 by the base station at the NCT carrier. At this time, if the downlink data are scheduled through the TM-dedicated DCI format (for example, DCI format 2C), the user equipment may receive the downlink data by using the DM-RS transmitted through antenna ports 7 to 14. Also, if the downlink data are scheduled through the TM-common DCI format (for example, DCI format 1A), the user equipment may receive the downlink data by using the DM-RS transmitted through the antenna port 7 (or 8). In case of the TM-common DCI format (for example, DCI format 1A), the user equipment may receive the downlink data at the legacy carrier by using the DM-RS transmitted through the single antenna port 7 in case of MBSFN subframe and using the CRS transmitted through the transmit diversity scheme or single antenna port 0 in case of non-MBSFN subframe.

As still another example of the method 1, the transmission mode for downlink data transmission may be set to TM 10 by the base station at the NCT carrier. If the transmission mode is set to TM 10, the description of the TM 9 may be applied to the TM 10 except that the TM-dedicated DCI format may be DCI format 2D, for example.

In case of the method 1, PDCCH blind detection for two types of DCI formats (TM-dedicated or TM-common DCI format) may be accompanied for all the downlink subframes.

Second Embodiment

Figure 14:
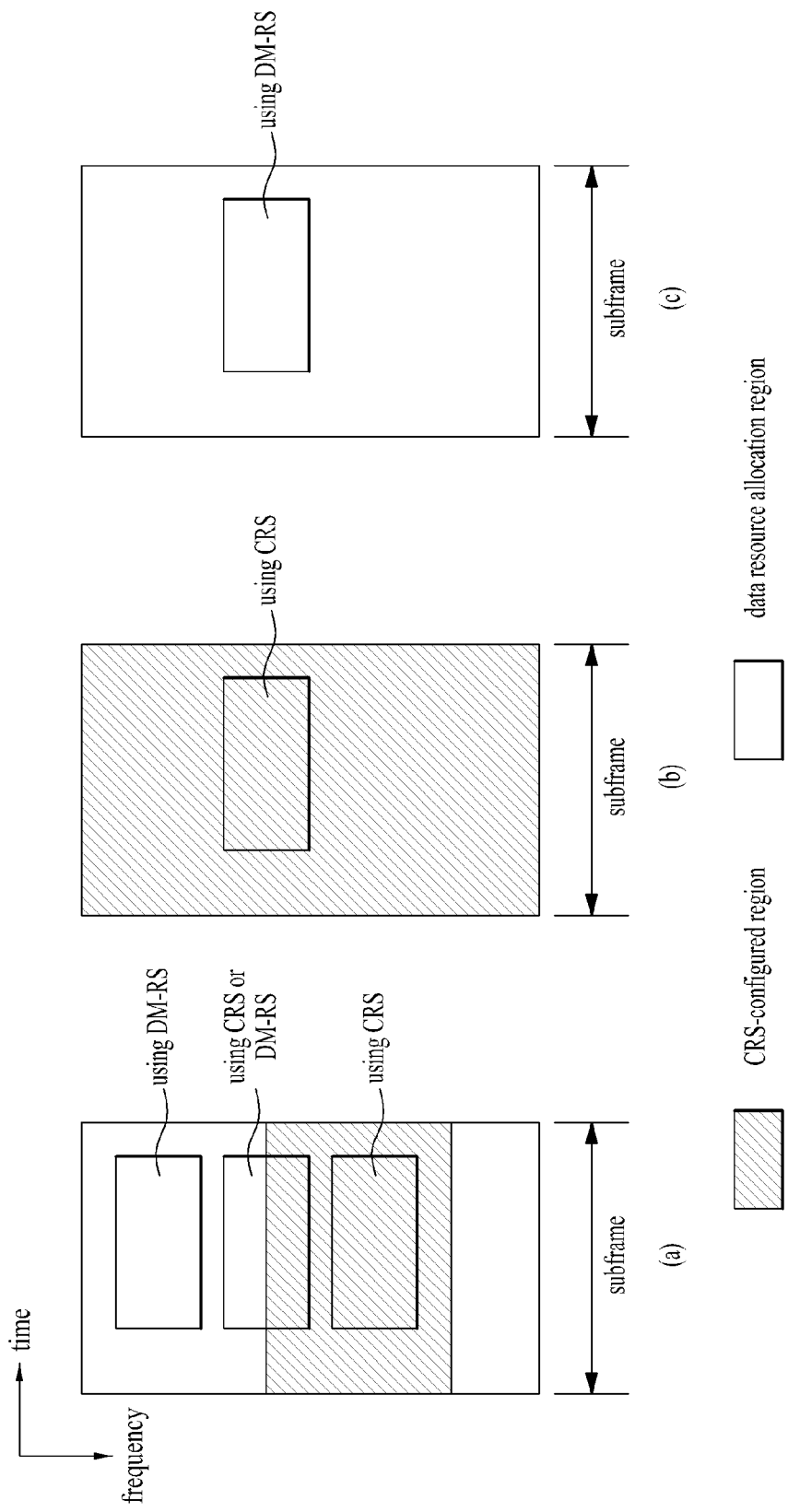
FIGS. 14 and 15 are diagrams illustrating a method for receiving downlink data according to the second embodiment of the present invention.

FIG. 14 is a diagram illustrating a method for receiving downlink data according to the second embodiment of the present invention. The method (hereinafter, referred to as "method 2") according to the second embodiment of the present invention is that downlink data are scheduled/received using a DM-RS of a single antenna port or CRS depending on a region where the CRS is transmitted during scheduling through the TM-common DCI format (that is, depending on CRS-configured region or CRS-less region).

Referring to FIG. 14($a$), if the CRS-configured region is configured for a part of a full frequency band at the subframe, the user equipment may receive downlink data by using the CRS if a downlink data resource allocation region scheduled through a corresponding DCI format is limited with the CRS-configured region. If not so (that is, if all or some of the corresponding downlink data resource allocation region is included in the CRS-less region), the user equipment may receive the downlink data by using the DM-RS of the single antenna port.

Alternatively, if the CRS-configured region is configured for a part of a full frequency band at the subframe and a downlink data resource allocation region scheduled through the corresponding DCI format is overlapped with the CRS-configured region fully or partially, the user equipment may receive downlink data by using the CRS. If not so (that is, if the entire downlink data resource allocation region is included in the CRS-less region only), the user equipment may receive the downlink data by using the DM-RS of the single antenna port.

Referring to FIG. 14(b), if the CRS-configured region is configured for the full frequency band at the subframe, since the downlink data resource allocation region scheduled through the corresponding DCI format is limited within the CRS-configured region, the user equipment may receive the downlink data by using the CRS.

Referring to FIG. 14(c), if the CRS-less region is only configured at the subframe, since the corresponding downlink data resource allocation region is included in the CRS-less region, the user equipment may receive the downlink data by using the DM RS only of the single antenna port.

As an example of the method 2, the transmission mode for downlink data transmission may be set to TM 8 by the base station at the NCT carrier. At this time, if the downlink data are scheduled through the TM-dedicated DCI format (for example, DCI format 2B), the user equipment may receive the downlink data by using the DM-RS transmitted through antenna port 7 and/or 8. Also, for example, if the downlink data are scheduled in the CRS-less region through the TM-common DCI format (for example, DCI format 1A), the user equipment may receive the downlink data by using the DM-RS transmitted through the antenna port 7 (or 8). Also, for example, if the downlink data are scheduled in the CRS-configured region through the TM-common DCI format (for example, DCI format 1A), the user equipment may receive the downlink data by using the CRS transmitted through the transmit diversity scheme or single antenna port 0 (or 1, 2, or 3). In case of the TM-common DCI format (for example, DCI format 1A), the user equipment may receive the downlink data by using the CRS transmitted through the transmit diversity scheme or single antenna port 0 at the legacy carrier.

As another example of the method 2, the transmission mode for downlink data transmission may be set to TM 9 by the base station at the NCT carrier. At this time, if the downlink data are scheduled through the TM-dedicated DCI format (for example, DCI format 2C), the user equipment may receive the downlink data by using the DM-RS transmitted through antenna ports 7 to 14 for the downlink subframe. Also, for example, if the downlink data are scheduled in the CRS-less region through the TM-common DCI format (for example, DCI format 1A), the user equipment may receive the downlink data by using the DM-RS transmitted through the antenna port 7 (or 8). Also, for example, if the downlink data are scheduled in the CRS-configured region through the TM-common DCI format (for example, DCI format 1A), the user equipment may receive the downlink data by using the CRS transmitted through the transmit diversity scheme or antenna port 0 (or 1, 2, or 3). In case of the TM-common DCI format (for example, DCI format 1A), the user equipment may receive the downlink data at the legacy carrier by using the DM-RS transmitted through the single antenna port 7 in case of MBSFN subframe and using the CRS transmitted through the transmit diversity scheme or single antenna port 0 in case of non-MBSFN subframe.

As still another example of the method 2, the transmission mode for downlink data transmission may be set to TM 10 by the base station at the NCT carrier. If the transmission mode is set to TM 10, the description of the TM 9 may be applied to the TM 10 except that the TM-dedicated DCI format may be DCI format 2D, for example.

Even in case of the method 2, PDCCH blind detection for two types of DCI formats (TM-dedicated or TM-common DCI format) may be accompanied for all the downlink subframes.

Figure 15:
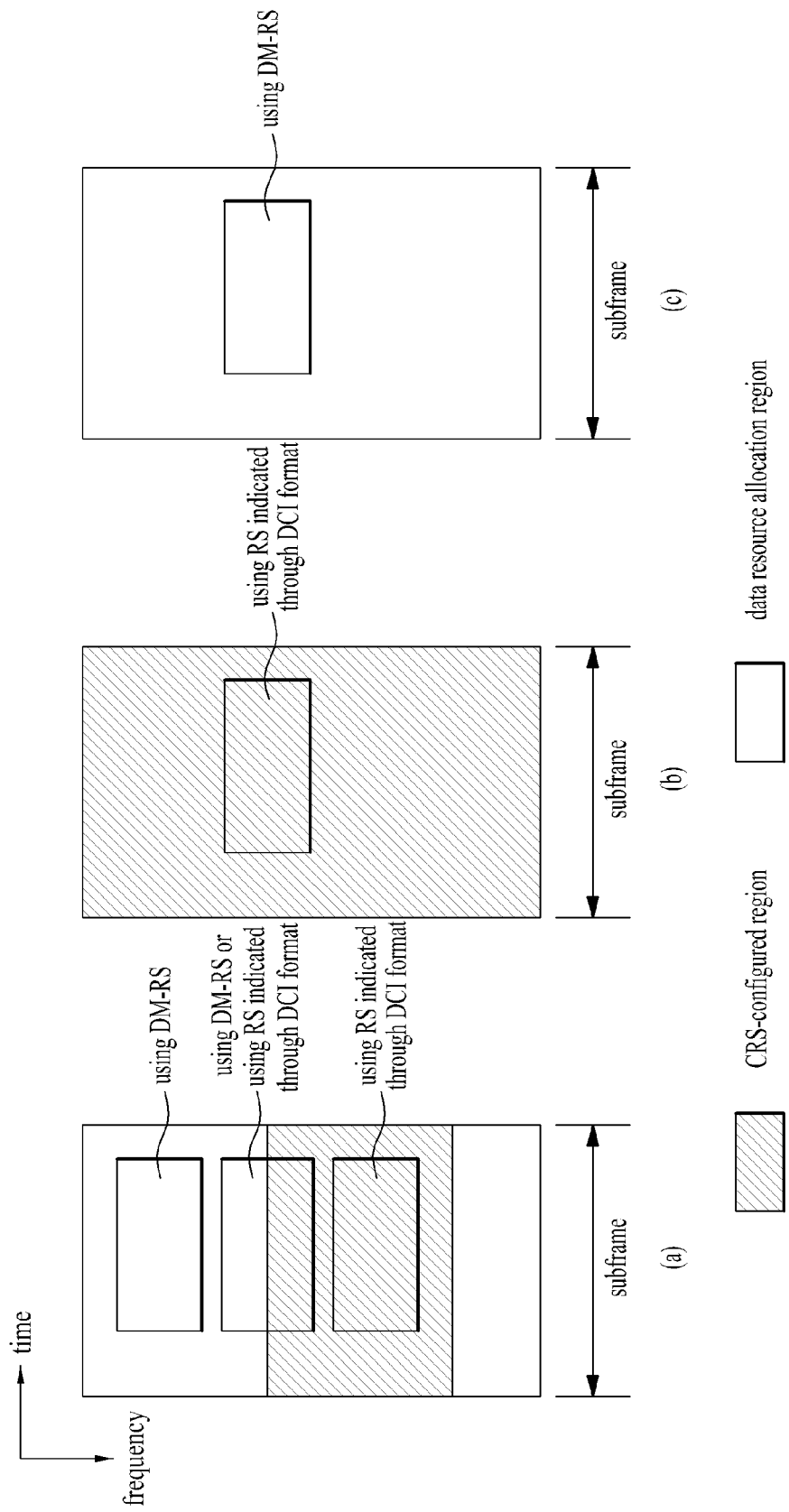

FIG. 15 is a diagram illustrating a modified method (hereinafter, referred to as "method 2-1") of a method for receiving downlink data according to the second embodiment of the present invention.

Referring to FIG. 15(a), if the CRS-configured region is configured for a part of a full frequency band at the subframe and all or some of a downlink data resource allocation region scheduled through the TM-common DCI format is included in the CRS-less region, the user equipment may receive the downlink data by using the DM-RS of the single antenna port in the same manner as the method 2. In this case, a specific field indicating the RS within the corresponding DCI format may be used for virtual CRC or may be disregarded. If not so (that is, if the downlink data resource allocation region is limited within the CRS-configured region), the user equipment may receive the downlink data by using the RS (DM-RS of the single antenna port or CRS) indicated through the specific field within the corresponding DCI format.

Alternatively, if the entire downlink data resource allocation region scheduled through the TM-common DCI format is included in the CRS-less region only, the user equipment may receive downlink data by using the DM-RS of the single antenna port in the same manner as the method 2. In this case, the specific field indicating the RS within the corresponding DCI format may be used for virtual CRC or may be disregarded. If not so (that is, if the downlink data resource allocation region is overlapped with the CRS-configured region fully or partially), the user equipment may receive the downlink data by using the RS (DM-RS of the single antenna port or CRS) indicated through the specific field within the corresponding DCI format.

Referring to FIG. 15(b), if the CRS-configured region is configured for the full frequency band at the subframe, since the downlink data resource allocation region scheduled through the corresponding DCI format is limited within the CRS-configured region, the user equipment may receive the downlink data by using the RS (DM-RS of the single antenna port or CRS) indicated through the specific field within the corresponding DCI format.

Referring to FIG. 15(c), if the CRS-less region is only configured at the subframe, since the corresponding downlink data resource allocation region is included in the CRS-less region, the user equipment may receive the downlink data by using the DM RS only of the single antenna port. In this case, the specific field indicating the RS within the corresponding DCI format may be used for virtual CRC or may be disregarded.

As a detailed example of allocation of a specific field within the DCI format in the method 2-1, 1) a 1-bit field for indicating RS (DM-RS or CRS) for downlink data reception may explicitly be inserted separately into the TM-common DCI format, 2) the 1-bit field within the specific field previously existing within the TM-common DCI format may be used to indicate the RS (DM-RS or CRS) for downlink data reception), or 3) the RS (DM-RS or CRS) for downlink data reception may be identified implicitly in accordance with combination of specific field values previously existing within the TM-common DCI format.

As another method, the user equipment may always receive the downlink data by using the RS (DM-RS of the single antenna port or CRS) indicated through the specific field within the corresponding DCI format without identification for the region (that is, CRS-configured region or CRS-less region) where the CRS is transmitted during scheduling through the TM-common DCI format. Even at this time, the above examples 1), 2) and 3) indicating the RS for downlink data reception may be applied to this method.

Third Embodiment

Figure 16:
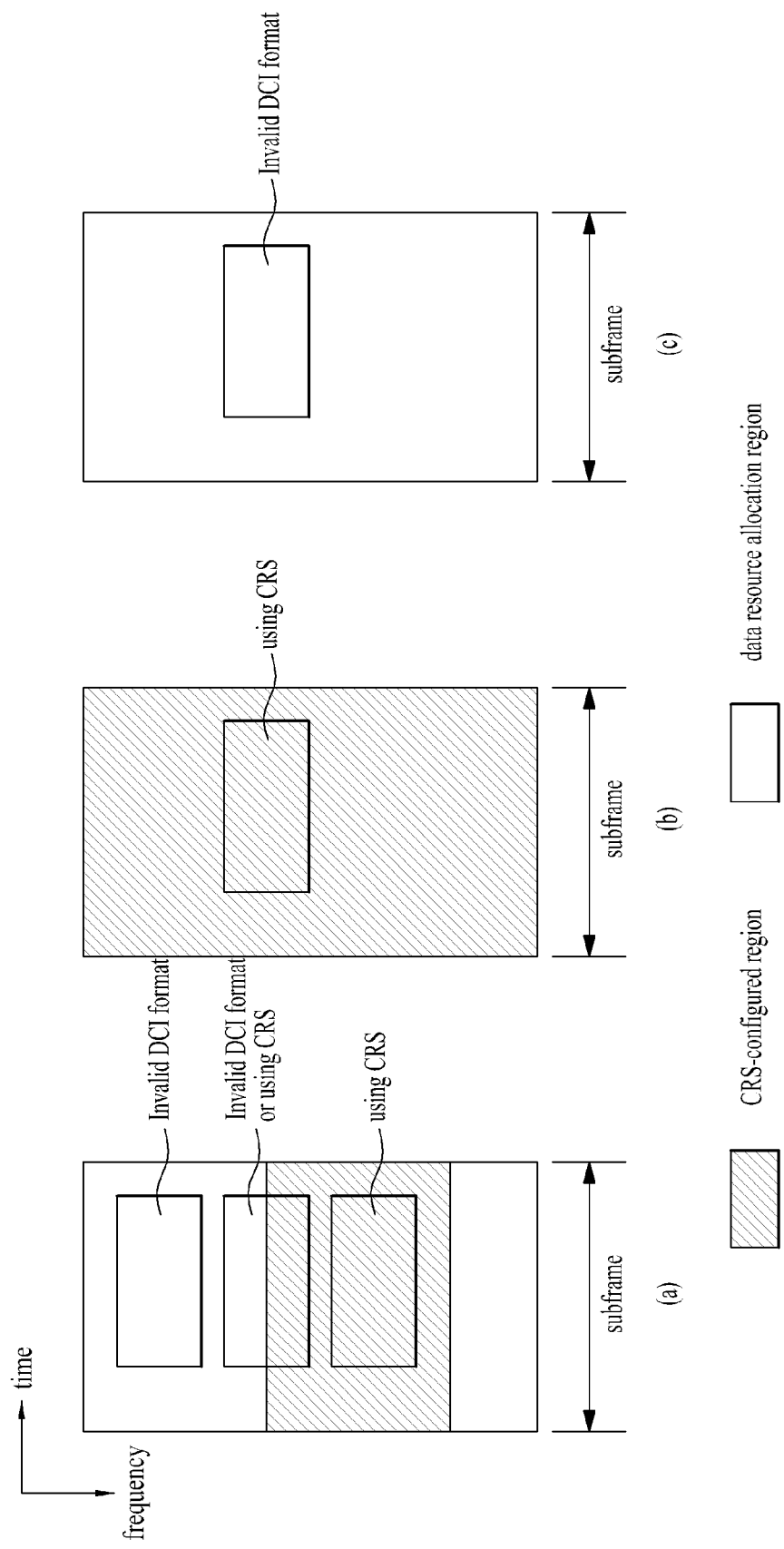
FIGS. 16 and 17 are diagrams illustrating a method for receiving downlink data according to the third embodiment of the present invention.

FIG. 16 is a diagram illustrating a method for receiving downlink data according to the third embodiment of the present invention. The method (hereinafter, referred to as "method 3") according to the third embodiment of the present invention is that CRS based downlink data are scheduled/received depending on a region where the CRS is transmitted during scheduling through the TM-common DCI format. In other words, in the method 3, downlink data scheduling through the TM-common DCI format may mean that it is performed through the CRS-configured region at the subframe that includes the CRS-configured region.

Referring to FIG. 16(a), if the CRS-configured region is configured for a part of a full frequency band at the subframe, the user equipment may receive the downlink data by using the CRS only if a downlink data resource allocation region scheduled through a corresponding DCI format is limited with the CRS-configured region. If not so (that is, if all or some of the corresponding downlink data resource allocation region is included in the CRS-less region), downlink data scheduling through the TM-common DCI format may not be defined. If downlink data scheduling is not defined, since the detected TM-common DCI format is not valid, data demodulation (for example, PDSCH decoding) may not be performed.

Alternatively, the user equipment may perform the downlink data reception operation based on the CRS only if the downlink data resource allocation region scheduled through the corresponding DCI format is overlapped with the CRS-configured region fully or partially. If not so (that is, if the entire downlink data resource allocation region is included in the CRS-less region only), downlink data scheduling through the TM-common DCI format may not be defined. If downlink data scheduling is not defined, since the detected TM-common DCI format is not valid, data demodulation (for example, PDSCH decoding) may not be performed.

Referring to FIG. 16(b), if the CRS-configured region is configured for the full frequency band at the subframe, since the downlink data resource allocation region scheduled through the corresponding DCI format is limited within the CRS-configured region, the user equipment may receive the downlink data by using the CRS.

Referring to FIG. 16(c), if the CRS-less region is only configured at the subframe, since the corresponding downlink data resource allocation region is included in the CRS-less region, downlink data scheduling through the TM-common DCI format may not be defined. In other words, the user equipment may perform PDCCH blind detection for the TM-dedicated DCI format only.

As an example of the method 3, the transmission mode for downlink data transmission may be set to TM 8/9/10 at the NCT carrier. At this time, if the downlink data are scheduled in the CRS-configured region through the TM-common DCI format (for example, DCI format 1A), the user equipment may receive the downlink data by using the CRS transmitted through the transmit diversity scheme or antenna port 0 (or 1, 2, or 3).

In case of the method 3, PDCCH blind detection for two types of DCI formats (TM-dedicated or TM-common DCI format) may be accompanied for the downlink subframe that includes the CRS-configured region, whereas PDCCH blind detection for one type of DCI format (TM-dedicated DCI format) may be accompanied for the other downlink subframe that does not include the CRS-configured region.

Figure 17:
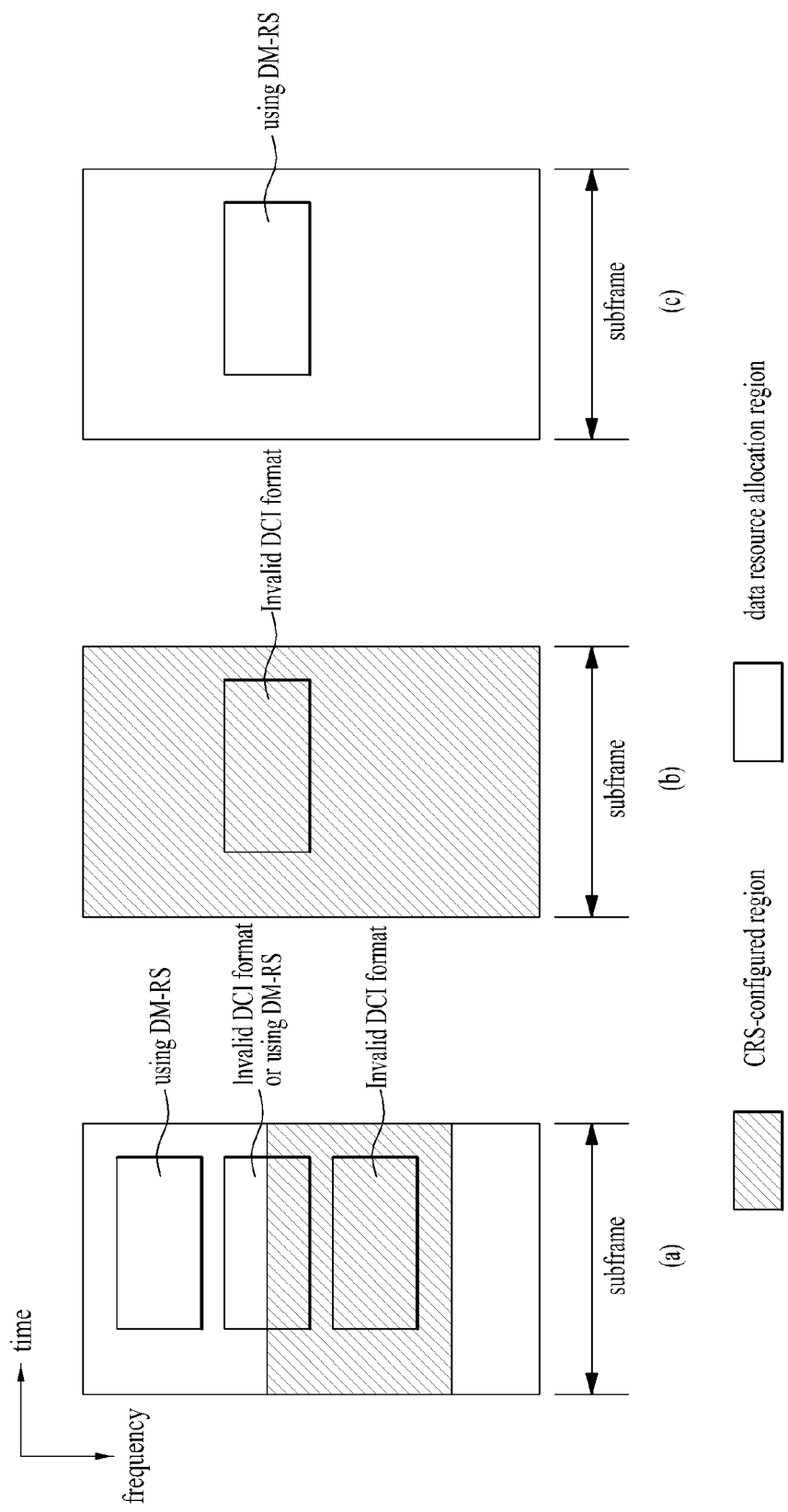

FIG. 17 is a diagram illustrating a modified method (hereinafter, referred to as "method 3-1") of a method for receiving downlink data according to the third embodiment of the present invention.

Referring to FIG. 17(a), if the CRS-configured region is configured for a part of a full frequency band at the subframe, the user equipment may perform downlink data reception operation based on the DM-RS only if the downlink data resource allocation region scheduled through the corresponding DCI format is limited in the CRS-less region. If not so (that is, if all or some of the corresponding downlink data resource allocation region is included in the CRS-configured region), downlink data scheduling through the TM-common DCI format may not be defined. If downlink data scheduling is not defined, since the detected TM-common DCI format is not valid, data demodulation (for example, PDSCH decoding) may not be performed.

Alternatively, the user equipment may perform the downlink data reception operation based on the DM-RS only if the downlink data resource allocation region scheduled through the corresponding DCI format is overlapped with the CRS-less region fully or partially. If not so (that is, if the entire downlink data resource allocation region is included in the CRS-configured region only), downlink data scheduling through the TM-common DCI format may not be defined. If downlink data scheduling is not defined, since the detected TM-common DCI format is not valid, data demodulation (for example, PDSCH decoding) may not be performed.

Referring to FIG. 17(b), if the CRS-configured region is configured for the full frequency band at the subframe, since the downlink data resource allocation region scheduled through the corresponding DCI format is limited within the CRS-configured region, downlink data scheduling through the TM-common DCI format may not be defined. In other words, the user equipment may perform PDCCH blind detection for the TM-dedicated DCI format only.

Referring to FIG. 17(c), if the CRS-less region is only configured at the subframe, since the corresponding downlink data resource allocation region is included in the CRS-less region, the user equipment may receive the downlink data by using the DM RS.

In the method 3-1, if the CRS is transmitted through a full system bandwidth, PDCCH blind detection for one type of DCI format (TM-dedicated DCI format) may be accompanied for the downlink subframe that includes the CRS-configured region, whereas PDCCH blind detection for two types of DCI formats (TM-dedicated or TM-common DCI format) may be accompanied for the other downlink subframe that does not include the CRS-configured region.

Which one of the methods 1 to 3 suggested as above will be applied may be configured UE-specifically through higher layer signaling such as RRC. For example, if cross-CC scheduling is configured to transmit and receive DL grant PDCCH, which is for scheduling downlink data transmitted through the NCT carrier, through another component carrier CC not the corresponding NCT carrier, one of the methods 1 to 3 may be applied. And, if DL grant PDCCH, which is for scheduling downlink data transmitted through the NCT carrier, is configured to be transmitted in the form of E-PDCCH through the corresponding NCT carrier, the method 1 may be applied. This is because that the corresponding E-PDCCH may preferably be transmitted and received using (precoded) DM-RS to reduce RS overhead and acquire more advanced PDCCH throughput even in case of the E-PDCCH (on the NCT carrier) and the result of DM-RS channel estimation used for corresponding E-PDCCH detection may be reused usefully if downlink data scheduling/reception related to transmission and reception of the corresponding E-PDCCH may be performed based on the DM-RS.

Figure 18:
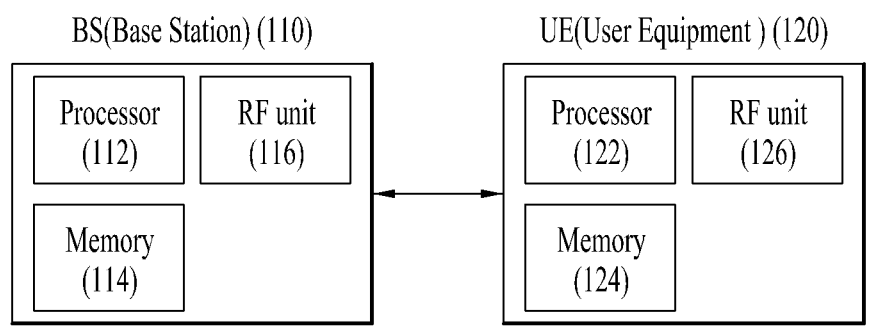
FIG. 18 is a diagram illustrating a base station and a user equipment, which may be applied to the present invention.

FIG. 18 is a diagram illustrating a base station and a user equipment, which may be applied to the present invention.

Referring to FIG. 18, the wireless communication system includes a base station (BS) 110 and a user equipment (UE) 120. If the wireless communication system includes a relay, the base station or the user equipment may be replaced with the relay.

The base station 110 includes a processor 112, a memory 114, and a radio frequency (RF) unit 116. The processor 112 may be configured to implement procedures and/or methods suggested in the present invention. The memory 114 is connected with the processor 112 and stores various kinds of information related to the operation of the processor 112. The RF unit 116 is connected with the processor 112 and transmits and/or receives a radio signal. The user equipment 120 includes a processor 122, a memory 124, and a radio frequency (RF) unit 126. The processor 122 may be configured to implement procedures and/or methods suggested in the present invention. The memory 124 is connected with the processor 122 and stores various kinds of information related to the operation of the processor 122. The RF unit 126 is connected with the processor 122 and transmits and/or receives a radio signal.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

A specific operation which has been described as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiment according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention may be used for a wireless communication apparatus such as a user equipment and a base station.

The invention claimed is:

1. A method for receiving data by a user equipment in a wireless communication system, the method comprising:
   receiving a transmission mode-common (TM-common) downlink control information (DCI) format including downlink scheduling information, the TM-common DCI format further including a specific field indicating a reference signal used for demodulation of the data; and
   receiving the data through a resource indicated by the downlink scheduling information,
   wherein, when at least part of the resource indicated by the downlink scheduling information is included in a resource block in which a cell-common reference signal is not configured, the data is demodulated using a user equipment-specific (UE-specific) reference signal, and
   wherein, when the resource indicated by the downlink scheduling information is included in a resource block in which the cell-common reference signal is configured, the data is demodulated using the reference signal indicated by the specific field from among the UE-specific reference signal or the cell-common reference signal.

2. The method according to claim 1, wherein the data is received on a component carrier via which the cell-common reference signal is received at a specific subframe only.

3. The method according to claim 1, wherein the cell-common reference signal is a reference signal for acquisition of channel state information and measurement of handover.

4. The method according to claim 1, wherein the UE-specific reference signal is received through an antenna port 7 or 8, and the cell-common reference signal is received through an antenna port 0.

5. The method according to claim 1, wherein, when at least part of the resource indicated by the downlink scheduling information is included in a resource block in which the cell-common reference signal is not configured, the specific field is used for cyclic redundancy check (CRC).

6. A user equipment configured to receive data from a base station in a wireless communication system, the user equipment comprising:
   a radio frequency (RF) module; and
   a processor, wherein the processor is configured to receive a transmission mode-common (TM-common) downlink control information (DCI) format including downlink scheduling information, the TM-common DCI format further including a specific field indicating a reference signal used for demodulation of the data, and receive the data through a resource indicated by the downlink scheduling information,
   wherein, when at least part of the resource indicated by the downlink scheduling information is included in a resource block in which a cell-common reference signal is not configured, the data is demodulated using a user equipment-specific (UE-specific) reference signal, and
   wherein, when the resource indicated by the downlink scheduling information is included in a resource block in which the cell-common reference signal is configured, the data is demodulated using the reference signal indicated by the specific field from among the UE-specific reference signal or the cell-common reference signal.

7. The user equipment according to claim 6, wherein the data is received on a component carrier via which the cell-common reference signal is received at a specific subframe only.

8. The user equipment according to claim 6, wherein the cell-common reference signal is a reference signal for acquisition of channel state information and measurement of handover.

9. The user equipment according to claim 6, wherein the UE-specific reference signal is received through an antenna port 7 or 8, and the cell-common reference signal is received through an antenna port 0.

10. The user equipment according to claim 6, wherein, when at least part of the resource indicated by the downlink scheduling information is included in a resource block in which the cell-common reference signal is not configured, the specific field is used for cyclic redundancy check (CRC).

* * * * *